(12) United States Patent
Rizzolatti et al.

(10) Patent No.: US 12,362,648 B2
(45) Date of Patent: Jul. 15, 2025

(54) POWER CONVERSION PHASES AND COUPLING INDUCTANCE

(71) Applicant: Infineon Technologies Austria AG, Villach (AT)

(72) Inventors: Roberto Rizzolatti, Villach (AT); Cheng-Wei Chen, Torrance, CA (US); Christian Rainer, Magdalensberg (AT); Mario Ursino, Villach (AT)

(73) Assignee: Infineon Technologies Austria AG, Villach (AT)

( * ) Notice: Subject to any disclaimer, the term of this patent is extended or adjusted under 35 U.S.C. 154(b) by 288 days.

(21) Appl. No.: 17/734,339

(22) Filed: May 2, 2022

(65) Prior Publication Data
US 2023/0353036 A1    Nov. 2, 2023

(51) Int. Cl.
| H02M 3/06 | (2006.01) |
| H02M 1/00 | (2006.01) |
| H02M 1/088 | (2006.01) |
| H02M 7/483 | (2007.01) |

(52) U.S. Cl.
CPC ......... *H02M 1/0095* (2021.05); *H02M 1/009* (2021.05); *H02M 1/088* (2013.01); *H02M 3/06* (2013.01); *H02M 7/4833* (2021.05); *H02M 7/4837* (2021.05)

(58) Field of Classification Search
CPC .... H02M 1/009; H02M 1/0095; H02M 1/088; H02M 7/483; H02M 7/4833; H02M 7/4837; H02M 3/06; H02M 3/07; H02M 3/072

See application file for complete search history.

(56) References Cited

U.S. PATENT DOCUMENTS

| 10,256,729 | B1 * | 4/2019 | Notsch | H02M 1/14 |
| 10,615,697 | B1 * | 4/2020 | Ferrari | H02M 3/1584 |
| 10,651,731 | B1 * | 5/2020 | Rainer | H02M 3/1588 |
| 11,532,987 | B2 * | 12/2022 | Han | H02M 1/0058 |
| 11,984,796 | B2 * | 5/2024 | Michal | H02M 1/0095 |
| 2019/0334433 | A1 | 10/2019 | Woo | |
| 2020/0204070 | A1 * | 6/2020 | Schwabe | H02M 3/156 |

(Continued)

FOREIGN PATENT DOCUMENTS

WO    2021033412 A1    2/2021

OTHER PUBLICATIONS

Sarmukhanov, Radkhan, et al., "Practical Engineering Approach to Natural Voltage Balancing Analysis in Multilevel Converters with Balance Booster" 2015 IEEE 5th International Conference on Power Engineering, Energy and Electrical Drives (Powereng), May 11, 2015 (May 11, 2015), pp. 188-192, XP033206312.

(Continued)

*Primary Examiner* — Thienvu V Tran
*Assistant Examiner* — Shahzeb K Ahmad
(74) *Attorney, Agent, or Firm* — Armis IP Law, LLC

(57) ABSTRACT

An apparatus such as a power converter includes a first flying capacitor operative to store a first flying capacitor voltage; a second flying capacitor operative to store a second flying capacitor voltage; an inductor providing coupling between the first flying capacitor and the second flying capacitor; and a network of switches operative to, in accordance with control signals, produce an output voltage via the first flying capacitor voltage and the second flying capacitor voltage.

20 Claims, 21 Drawing Sheets

(56) References Cited

U.S. PATENT DOCUMENTS

| | | | |
|---|---|---|---|
| 2020/0358352 A1* | 11/2020 | Rizzolatti | H02M 3/01 |
| 2022/0006382 A1 | 1/2022 | Wu et al. | |
| 2022/0231600 A1* | 7/2022 | Jong | H02M 3/07 |
| 2022/0231618 A1* | 7/2022 | Yan | H02M 3/1584 |
| 2022/0286049 A1 | 9/2022 | Fujii | |
| 2023/0318447 A1* | 10/2023 | Lim | H02M 3/1586 |
| | | | 323/271 |

OTHER PUBLICATIONS

Zhou, Daniel H., "Intrinsic and Robust Voltage Balancing of FCML Converters with Coupled Inductors", 2021 IEEE 22nd Workshop on Control and Modelling Ofpower Electronics (COMPEL), IEEE; Nov. 2, 2021 (Nov. 2, 2021), pp. 1-8, XP034058546.

EP Extended Search Report, EP 23 17 0781, Sep. 27, 2023, pp. 1-13.

* cited by examiner

POWER CONVERSION PHASES AND COUPLING INDUCTANCE

BACKGROUND

Data centers such as operated by Google™, Facebook™, and others provide indispensable services for our society. The energy consumption for all data centers worldwide is around 2% of overall electric energy usage. Therefore, datacenter providers are constantly looking to improve the efficiency of power conversion in order to save energy or to be able to increase the CPU/GPU/ASIC, etc., power of servers in existing data centers. Machine learning and artificial intelligent architectures require very powerful GPUs or custom designed ASICs to meet the required calculation power.

Operating the system with 40-V to 60-V input voltage bus instead of 12-V bus offers serval advantages.

The first stage is converting the high input voltage down to an intermediate voltage. This first stage can be an unregulated or regulated, high efficient and densely steps down converter so called intermediate bus converter (IBC). The second stage is based on the common buck converter with very good transient response and high efficiency.

Covering wide input range from 40V to 60V with a 4:1 fixed-ratio converter is leading to a Vout change from approximately about 9-V to 15-V which provides a good combination of efficiency and dynamic performance.

At 40V input, a 4:1 fixed ratio converter produces about 9.2-V output at full load. This forces the converter to operate with 20% higher output current comparing with nominal operating condition. A regulated IBC has a constant 12V output voltage over the full input voltage range so the current increase for fixed-load power is considerable less, yielding a significant saving in conduction losses. Another benefit is that at maximum input voltage (60V) the output voltage is reaches high voltages, typically 14.5-V, which makes the following PoLs less efficient.

One more benefit of a regulated IBC is that peripherals like PCIE, HD, FAN require a regulated 12-V rail, which cannot be supplied from an unregulated IBC converter. FIG. 2 is reporting an overview about the discussed power architectures starting from the classic 12-V bus rail, 48-V bus rail with an unregulated IBC and regulated DC/DC stage and finally a system with a single 48-V to 12-V regulated IBC.

BRIEF DESCRIPTION

Implementation of clean energy (or green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Alternatively, energy is received from a voltage generator. Regardless of whether energy is received from green energy sources or non-green energy sources, it is desirable to make most efficient use of raw energy (such as storage and subsequent distribution) provided by such systems to reduce our impact on the environment. This disclosure contributes to reducing our carbon footprint and better use of energy via more efficient energy conversion.

This disclosure further includes the observation that power conversion efficiency of conventional power supplies can be improved. For example, to this end, this disclosure includes novel ways of providing improved performance of power conversion via implementation of multiple flying capacitors.

More specifically, this disclosure includes an apparatus (such as power converter, power converter stage, etc.) comprising: a first flying capacitor operative to store a first flying capacitor voltage; a second flying capacitor operative to store a second flying capacitor voltage; and an inductor providing coupling between the first flying capacitor and the second flying capacitor; and a network of switches operative to produce an output voltage via the first flying capacitor voltage and the second flying capacitor voltage.

In contrast to conventional techniques of implementing a zero voltage switching inductor coupled between legs of a switched capacitor converter that simply generates an AC current used for zero voltage switching purposes, the inventive power converter apparatus as discussed herein may be a non-resonant power converter including an output inductor that outputs a regulated output voltage. The presence of the balancing inductor such as disposed between two legs (and respective flying capacitors) of the respective regulated power converter provides advantageous voltage balancing of flying capacitor voltages stored in the flying capacitors. Note further that the regulation may be enabled by the inductor.

The inductor may convey energy between the first flying capacitor and the second flying capacitor to provide voltage balancing of respective voltages stored in the flying capacitors.

The inductor may substantially equalize an average magnitude of the first flying capacitor voltage and an average magnitude of the second flying capacitor voltage. The network of switches may be operated to control conveyance of the energy received from an input voltage to the first flying capacitor and the second flying capacitor such that: i) the average magnitude of the first flying capacitor voltage is equal to a magnitude of the input voltage divided by 2 and ii) the average magnitude of the second flying capacitor voltage is equal to the magnitude of the input voltage divided by 2.

A first terminal of the inductor may be directly connected to a terminal of the first flying capacitor; and a second terminal of the inductor may be directly connected to a terminal of the second flying capacitor.

The apparatus may include a controller. The controller may control operation of the network of switches in a first mode in which: the first flying capacitor is charged, the second flying capacitor is discharged, and a magnitude of current through the inductor varies over time. The controller may control operation of the network of switches in a second mode in which: the first flying capacitor is neither charged or discharged and the second flying capacitor is neither charged nor discharged, and a magnitude of current through the inductor is constant.

The inductor may be a first inductor providing voltage balancing between the first flying capacitor and the second flying capacitor. The network of switches may include a first sequence of switches connected in series and a second sequence of switches connected in series. The first sequence of switches may include a first switch, a second switch, a third switch, and a fourth switch. The second sequence of switches may include a fifth switch, a sixth switch, a seventh switch, and an eighth switch. The apparatus may further include one or more of: a first node connecting the first switch and the second switch; a second node connecting the fifth switch and the sixth switch, the first inductor connected between the first node and the second node; a third node connecting the second switch and the third switch; a fourth node connecting the sixth switch and the seventh switch, the third node connected to the fourth node via an electrically conductive path; and an output inductor connected to the electrically conductive path, the output inductor operative to output the output voltage.

The inductor may be a first inductor providing voltage balancing between the first flying capacitor and the second flying capacitor. The network of switches may include a first sequence of switches connected in series and a second sequence of switches connected in series. The first sequence of switches may include a first switch, a second switch, a third switch, and a fourth switch. The second sequence of switches may include a fifth switch, a sixth switch, a seventh switch, and an eighth switch. The apparatus may further comprise a first node connecting the first switch and the second switch; a second node connecting the fifth switch and the sixth switch, the first inductor connected between the first node and the second node; a third node connecting the second switch and the third switch; a fourth node connecting the sixth switch and the seventh switch, the third node connected to the fourth node via an electrically conductive path; and an output inductor connected to the electrically conductive path, the output inductor operative to produce the output voltage. As further discussed herein, the output voltage may be a regulated voltage.

The inductor may be a first inductor providing voltage balancing between the first flying capacitor and the second flying capacitor. The network of switches may include a first sequence of switches connected in series and a second sequence of switches connected in series. The first sequence of switches may include a first switch, a second switch, a third switch, and a fourth switch. The second sequence of switches may include a fifth switch, a sixth switch, a seventh switch, and an eighth switch. The apparatus may further comprise: a first node connecting the first switch and the second switch; a second node connecting the fifth switch and the sixth switch, the first inductor connected between the first node and the second node; a third node connecting the second switch and the third switch; a fourth node connecting the sixth switch and the seventh switch, the third node connected to the fourth node via an electrically conductive path; and an input inductor connected between an input voltage source and the electrically conductive path, the input inductor operative to receive input current from the input voltage source and supply the input current to the electrically conductive path.

Yet further, the inductor may be a first inductor. The network of switches may be a first network of switches. A combination of the first flying capacitor, the second flying capacitor, the first inductor and the first network of switches may be disposed in a first flying capacitor power converter stage. The output voltage from the first flying capacitor power converter stage may be an intermediate voltage. The apparatus may further comprise a second flying capacitor power converter stage. The second flying capacitor power converter stage may comprise: a third flying capacitor to store a third flying capacitor voltage; a fourth flying capacitor to store a fourth flying capacitor voltage; a second inductor providing coupling between the third flying capacitor and the fourth flying capacitor; and a second network of switches operative to produce a second output voltage via the third flying capacitor voltage and the fourth flying capacitor voltage. The apparatus may include a third inductor coupling the first flying capacitor power converter stage and the second flying capacitor power converter stage; the third inductor may convey the intermediate voltage from the first flying capacitor power converter stage to an input of the second flying capacitor power converter stage. The first flying capacitor power converter stage may be implemented based on a buck or boost converter topology; the second switched-capacitor power converter stage may be implemented in accordance with a buck or boost buck converter topology.

The network of switches may include a first switch and a second switch. A first terminal of the first switch may be coupled to a reference voltage; a first terminal of the second switch may be coupled to the reference voltage; the inductor may be directly coupled between a second terminal of the first switch and a second terminal of the second switch. The reference voltage may be an input voltage supplied by an input voltage source; the input voltage may be converted into the output voltage. The reference voltage may be a ground reference voltage.

Yet further, the network of switches may include a first switch and a second switch, a first terminal of the first switch may be coupled to a first reference voltage, a first terminal of the second switch may be coupled to the first reference voltage; the inductor may be directly coupled between a second terminal of the first switch and a second terminal of the second switch. The network of switches may include a third switch and a fourth switch; a first terminal of the third switch may be coupled to a second reference voltage; a first terminal of the fourth switch may be coupled to the second reference voltage; the first switch and the second switch may be disposed in a first series circuit path between the first reference voltage and the second reference voltage; the third switch and the fourth switch may be disposed in a second series circuit path between the first reference voltage and the second reference voltage; the first flying capacitor may be connected between the second terminal of the first switch and a second terminal of the third switch; and the second flying capacitor may be connected between the second terminal of the second switch and a second terminal of the fourth switch.

A magnitude of current conveyed by the inductor between the first flying capacitor and the second flying capacitor may vary over time.

A direction of current conveyed by the inductor between the first flying capacitor and the second flying capacitor may change during a respective control cycle of converting an input voltage received by the network of switches into the output voltage. Note that the current through the inductor is nominally or average of current 0A, but if high unbalance between the two bridges is applied (such as due to driver mismatch, mosfet mismatch, ecc) a small DC current might appear in the inductor.

The apparatus may include a controller. The controller may control a duty cycle of controlling the network of switches based on a magnitude of the output voltage and/or to maintain a magnitude of the output voltage.

The first flying capacitor and the second flying capacitor may form a first flying capacitor pair associated with a first power converter stage of N power converter stages in the apparatus, where N is an integer value greater than 1; and each of the N power converter stages may include a corresponding pair of flying capacitors and a respective voltage balancing inductor providing coupling between the corresponding pair of flying capacitors.

This disclosure further includes a method comprising: storing a first flying capacitor voltage in a first flying capacitor; storing a second flying capacitor voltage in a second flying capacitor; via an inductor, providing inductive coupling between the first flying capacitor and the second flying capacitor; and controlling operation of a network of switches operative to produce an output voltage via the first flying capacitor voltage and the second flying capacitor voltage.

The method may include conveying energy between the first flying capacitor and the second flying capacitor via the inductive coupling.

Note that this disclosure includes useful techniques. For example, in contrast to conventional techniques, the novel power supply as described herein provides high efficiency of converting an input voltage to a respective output voltage via unique regulation of received flying capacitor voltages. More specifically, this disclosure includes a novel method, apparatus, system, etc., to balance flying capacitor voltages of a multi-level interleaved switched flying capacitor converter.

Note that any of the resources as discussed herein can include one or more computerized devices, apparatus, hardware, etc., execute and/or support any or all of the method operations disclosed herein. In other words, one or more computerized devices or processors can be programmed and/or configured to operate as explained herein to carry out the different techniques as described herein.

Other aspects of the present disclosure include software programs and/or respective hardware to perform any of the operations summarized above and disclosed in detail below.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of techniques herein (BRIEF DESCRIPTION) purposefully does not specify every novel aspect of the present disclosure or claimed invention(s). Instead, this brief description only presents general aspects and corresponding points of novelty over conventional techniques. For additional details and/or possible perspectives (permutations) of the invention(s), the reader is directed to the Detailed Description section (which is a summary) and corresponding figures of the present disclosure as further discussed below.

DETAILED DESCRIPTION

As previously discussed, this disclosure is useful over conventional techniques. For example, in contrast to conventional techniques, the novel power supply (such as non-resonant power converter) as described herein provides high efficiency of converting an input voltage to a respective output voltage via unique regulation of energy received from multiple flying capacitors. More specifically, this disclosure includes a novel method, apparatus, system, etc., to balance generation of flying capacitor voltages and use of corresponding stored energy in a multi-level interleaved converter topology to produce an output voltage.

Figure 1:
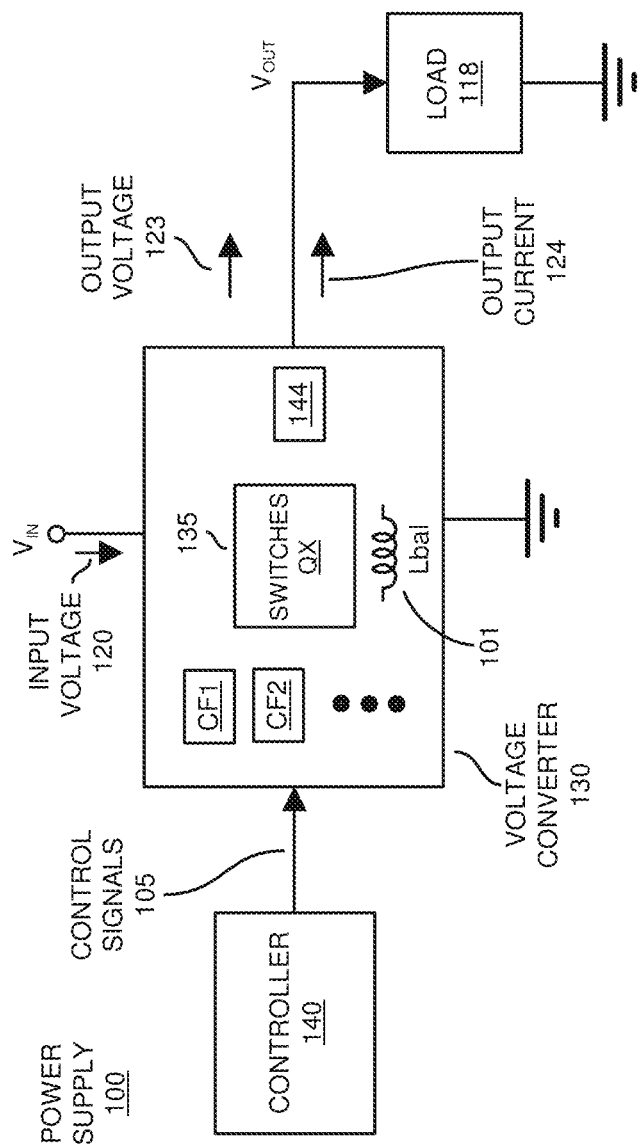
FIG. 1 is an example diagram illustrating a regulated voltage converter including multiple flying capacitors and a voltage balancing inductance component as discussed herein.

Now, more specifically, FIG. 1 is an example diagram illustrating a regulated voltage converter including multiple flying capacitors as described herein.

As shown in FIG. 1, power supply 100 includes a controller 140, voltage converter 130 (a.k.a., power converter, regulated power converter, non-resonant power converter, etc.), and load 118. Each of these components represents an entity such as an apparatus, electronic device, electronic circuitry, etc.

Note that each of the resources as described herein can be instantiated in any suitable manner. For example, the controller 140 can be instantiated as or include hardware (such as circuitry), software (executable instructions), or a combination of hardware and software resources where applicable.

The voltage converter 130 includes a first flying capacitor CF1, a second flying capacitor CF2 . . . , a network of switches 135 (such as including one or more switches Qx), (flying capacitor voltage balancing) inductor 101, and (output) inductor 144.

During operation, the network of switches 135 controls conveyance of energy from the one or more flying capacitors (such as CF1, CF2, etc.) to the inductor 101. The flying capacitors are charged and discharged from one or more reference voltages such as input voltage 120, ground, etc., via switching of the network of switches 135 controlled by controller 140.

The inductor 144 converts the received energy from the flying capacitors CF1, CF2, etc., and input voltage 120 into an output voltage 123 to power a load 118.

As discussed herein, the inductor 144 receives the energy as first current or first voltage from the first flying capacitor CF1, second current or second voltage from the second flying capacitor CF2, and so on. The inductor 144 and flying capacitors receive energy from the input voltage 120.

The controlled switching of the switches Qx (any number of switches) via generation of control signals 105 and presence of the inductor 101 results in generation of a balanced voltage (such as substantially equal voltage) stored in each of the flying capacitors CF1, CF2, etc.

As further discussed herein, the controller 140 implements controlled switching of the network of switches 135 to convert the input voltage 120 (such as a DC input voltage or quasi AC input voltage, etc.) into the output voltage 123 via the energy received from the multiple balanced flying capacitors and/or input voltage 120. More specifically, the first flying capacitor CF1 stores a first flying capacitor voltage. The second flying capacitor CF2 stores a second flying capacitor voltage. The inductor 101 provides inductive coupling between the first flying capacitor and the second flying capacitor. The inductor 101 conveys energy between the first flying capacitor CF1 and the second flying capacitor CF2. The controller 140 controls operation of the network of switches 135 to produce an output voltage 123 via the input voltage 120 and first flying capacitor voltage $V_{Cfly1}$ and the second flying capacitor voltage $V_{Cfly2}$. As further discussed herein, presence of the inductor 101 helps to substantially equalize an average magnitude of the first flying capacitor voltage $V_{Cfly1}$ and an average magnitude of the second flying capacitor voltage $V_{Cfly2}$.

Figure 2:
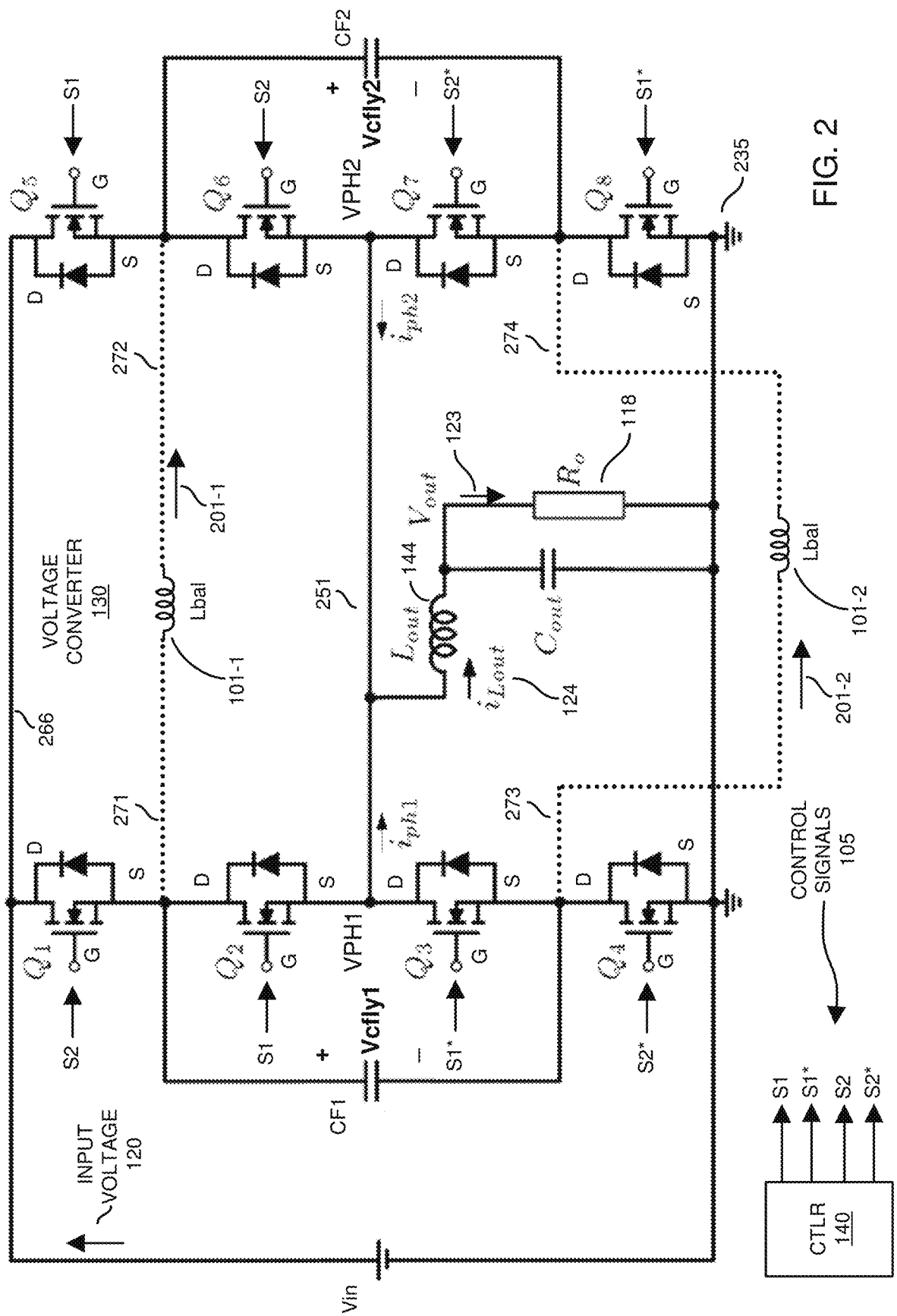
FIG. 2 is an example detailed diagram illustrating a regulated voltage converter including multiple flying capacitors and a voltage balancing inductor as described herein.

FIG. 2 is an example detailed diagram illustrating a regulated voltage converter including multiple flying capacitors as described herein.

A Three-Level Flying Capacitor Buck converter (3LFC) converter offers high efficiency and high power density as intermediate bus converter regulated. However, to achieve high efficiency and power density, the flying capacitors must be balanced (such as average flying capacitor voltage being equal or near equal) at half of the magnitude of the input voltage 120 supplied by input voltage source Vin.

This disclosure proposes a novel method to balance the voltages of the flying capacitors CF1 and CF2. To overcome the main limitation introduced by the balancing method, implemented at control level (i.e. need to sense floating voltage domain and to introduce an additional loop which might bring the system in instability), and to guarantee the flying capacitor balancing in all corner cases, this disclosure proposes a novel method to balance the flying capacitors for a two phases three level buck converter interleaved, having an inductive component (inductor 101) to generally maintain the same average voltage on the flying capacitors. The inductive component such as inductor 101, place to be stabilized the flying capacitor voltages, does not carry output current 124 to the load 118.

Figure 5:
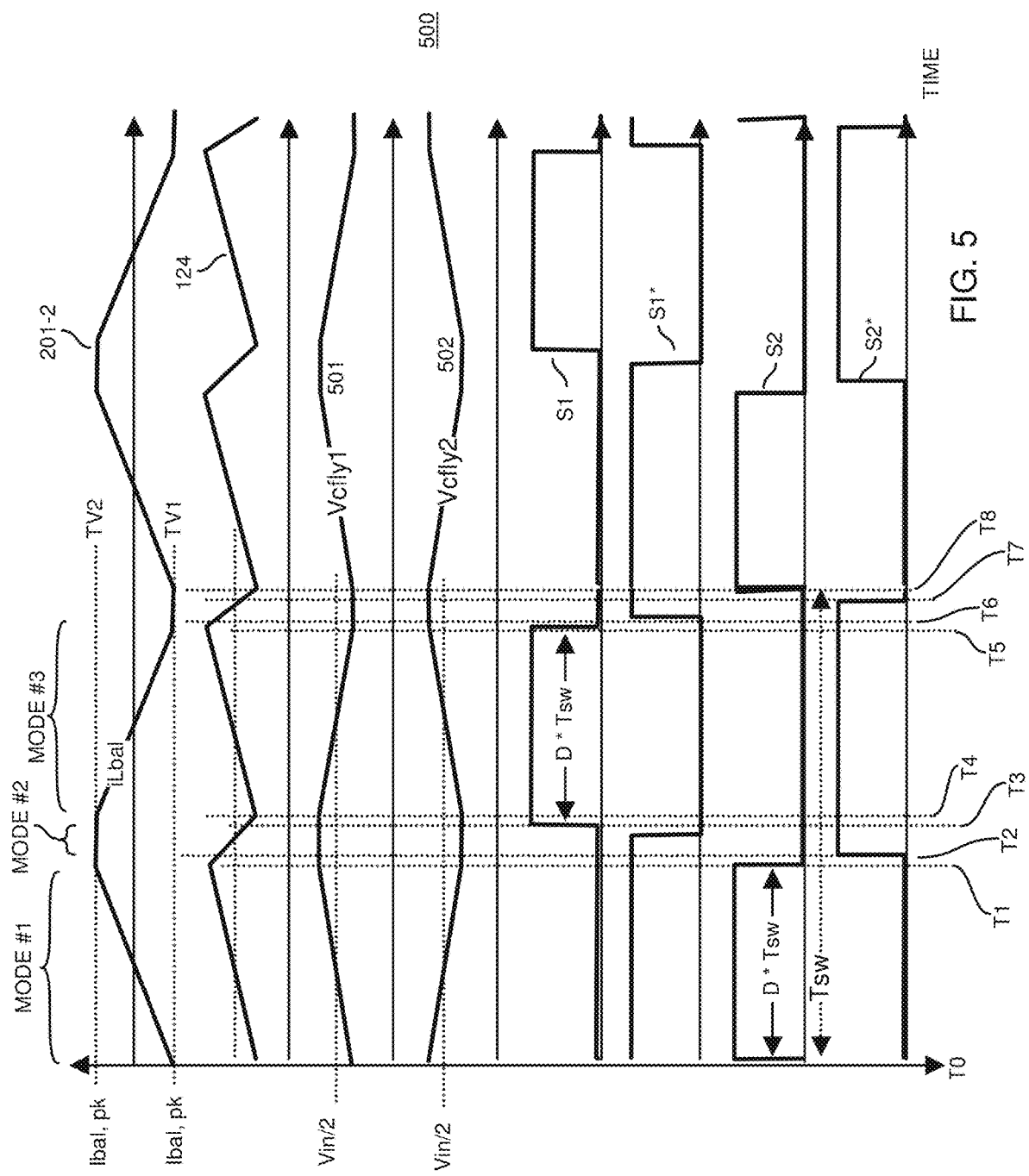
FIG. 5 is an example timing diagram illustrating control of multiple switches in a voltage converter as described herein.

FIG. 2 is an example diagram illustrating of a voltage converter 130 such as three level flying capacitor buck dual-phase converter (3LFC-DP) where the two 3LFC buck converter have their phase node shorted and are controlled in such a way to be phase shifted by 180° (see FIG. 5). As shown, a inductor 101 is placed either between the drain node of switch Q4 and drain node D of switch Q8 as inductor 101-2 or between the drain node D of switch Q2 and the drain node D of switch Q6, acting as inductive component to enhance balancing between flying capacitors CF1 and CF2 (i.e., the average magnitude of the flying capacitor voltage $V_{Cfly1}$ and the average magnitude of the flying capacitor voltage VCfly2 are substantially equal to half the magnitude of the input voltage 120). The presence of the inductor 101 prevents the magnitudes of the flying capacitor voltages from drifting apart.

Considering the circuit and the PWMs applied and the 3LFC-DP system, the two phase nodes, voltage at VPH1 and VPH2, are in phase, therefore they can be shorted together and connected to a common output inductance. The voltage converter 130 is controlled in such a way that within a part of one switching cycle T_sw the flying capacitors are connected in series with the input voltage, moreover the additional balancing inductor added L_bal ensures that both flying capacitors CF1 and CF2 are stabilized at the same average flying capacitor voltage (input voltage 120 divided by 2). A first terminal of the inductor 101-1 is directly connected to a terminal of the first flying capacitor CF1; a second terminal of the inductor 101 is directly connected to a terminal of the second flying capacitor CF2.

Indeed, by considering that the sum of the two voltages of the flying capacitors is always the input voltage Vin, it results that the average flying capacitor voltages are balanced to half of the input voltage. Thus, the network of switches controls conveyance of the energy received from an input voltage 120 to the first flying capacitor and the second flying capacitor; the average magnitude of the first flying capacitor voltage $V_{Cfly1}$ is substantially equal to the input voltage 120 divided by 2; and the average magnitude of the second flying capacitor voltage $V_{Cfly2}$ is substantially equal to the input voltage divided by 2.

As more specify shown, the voltage converter 130 in FIG. 2 includes network of switches 135 such as including switches Q1, Q2, Q3, Q4, Q5, Q6, Q7, and Q8. Voltage converter 130 also includes multiple flying capacitors such as flying capacitor FC1 (a.k.a., Cfly1), flying capacitor FC2 (a.k.a., Cfly2), etc. As previously discussed, voltage converter 130 also includes inductor 144 and capacitor Cout as well as inductor 101 (such as inductor 101-1 or inductor 101-2).

The switches Q1, Q2, Q3, and Q4 are connected in series between the input voltage node 266 (receiving input voltage 120) and the ground reference 235. For example, the drain node (D) of switch Q1 is connected to the input voltage source node; the source node(S) of switch Q1 is connected to the drain node (D) of switch Q2; the source node(S) of switch Q2 is connected to the drain node (D) of switch Q3; the source node(S) of switch Q3 is connected to the drain node (D) of switch Q4; the source node(S) of switch Q4 is connected to ground.

Controller 140 produces control signals S1 (a.k.a., Φa), S2 (a.k.a., Φb), S1*(a.k.a., Φa*), and S2*(a.k.a., Φb*), where S1* is the inversion of S1, where S2* is the inversion of S2.

As further shown, control signal S2 drives switch Q1; control signal S1 drives switch Q2; control signal S1* drives switch Q3; and control signal S2* drives switch Q4.

The switches Q5, Q6, Q7, and Q8 are connected in series between the input voltage node 266 and the ground reference 235. For example, the drain node (D) of switch Q5 is connected to the input voltage source node 266; the source node(S) of switch Q5 is connected to the drain node (D) of switch Q6; the source node(S) of switch Q6 is connected to the drain node (D) of switch Q7; the source node(S) of switch Q7 is connected to the drain node (D) of switch Q8; the source node(S) of switch Q8 is connected to ground.

As previously discussed, controller 140 produces control signals S1 (a.k.a., a), S2 (a.k.a., Φb), S1*(a.k.a., Φa*), and S2*(a.k.a., Φb*), where S1* is the inversion of S1, where S2* is the inversion of S2.

Control signal S1 drives switch Q5; control signal S2 drives switch Q6; control signal S2* drives switch Q7; and control signal S1* drives switch Q8.

Node 251 provides connectivity between the source node of switch Q2, the drain node of switch Q3, the source node of switch Q6, the drain node of switch Q7, and the inductor 144. The inductor 144 and capacitor Cout are connected in series between the node 251 and the ground reference voltage 235 of voltage converter 130.

Figure 3:
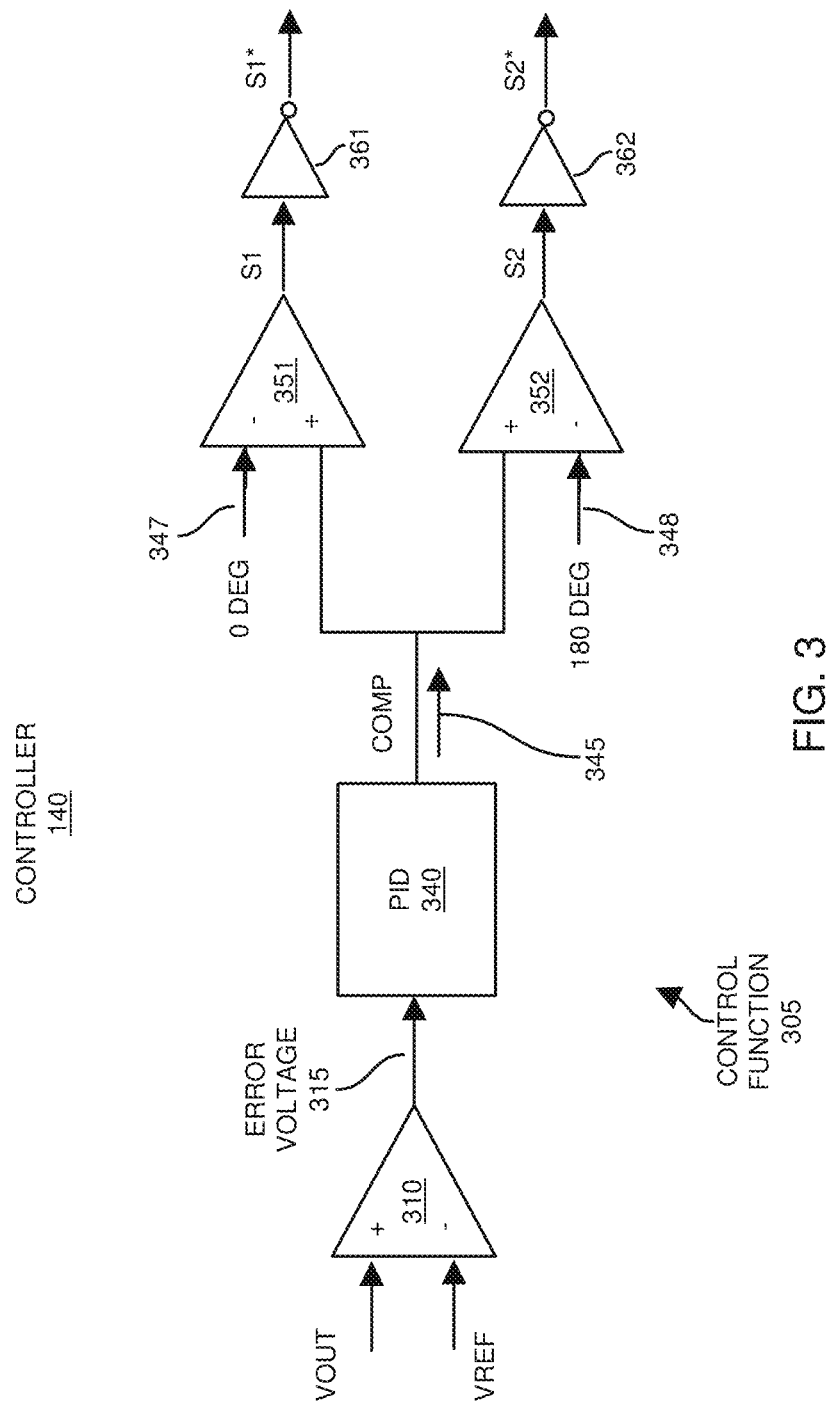
FIG. 3 is an example diagram illustrating a switch control signal generator as described herein.

As previously discussed, the voltage converter 130 in FIG. 2 is an example illustrating a dual-phase three level flying capacitor (D-3LFC) buck converter, where two 3LFC buck converters have their phase node shorted and are controlled via respective control signals 105 in such way to be phase shifted by 180°. FIG. 3 illustrates a control circuit and generation of phase shifted control signals 105 such as control signals S1, S2, S1*, and S2*.

In this implementation of the voltage converter 130 of FIG. 2, the two phase nodes, VPH1 and VPH2, are in phase with each other. Therefore, they can be shorted together and connected to a common output inductor 144 to produce the output voltage 123. As further discussed herein, the two 3LFC buck converter phases are controlled in such way that within a part of one switching cycle T_sw are connected in series with the input voltage and therefore their flying capacitor are naturally balanced to half of the input voltage 120 or other suitable value.

Thus, the inductor 101 is a first inductor providing voltage balancing between the first flying capacitor CF1 and the second flying capacitor CF2. The network of switches Q1 to Q8 includes a first sequence of switches Q1-Q4 connected in series and a second sequence of switches Q5 to Q8 connected in series. The inductor 101 is connected between node 271 and node 272 or between node 273 and node 274. Electrically conductive path (i.e., node 251) provides connectivity between switch pair Q2 and Q3 and switch pair Q6 and Q7.

FIG. 3 is an example diagram illustrating a switch control signal generator as described herein.

As shown, the controller 140 includes amplifier 310, control function 340 (such as a PID controller), comparator 351, comparator 352 inverter 361, and inverter 362.

During operation, the difference amplifier 310 produces the error voltage 315 based on a difference between the output voltage 120 with respect to a source reference setpoint voltage Vref. The control function 340 converts the received error voltage 315 into compensation signal 345 fed into the noninverting input of comparator 351 and the noninverting input of comparator 352. The ramp signal 347 is inputted to the noninverting input of comparator 351; the ramp signal 348 is inputted to the inverting input of comparator 352.

Comparator 351 produces control signal S1 whose duty cycle corresponds to a magnitude of the error voltage 315. Comparator 352 produces control signal S2 whose duty cycle corresponds to a magnitude of the error voltage 315.

The control signal S1 and the control signal S2 are out of phase with respect to each other by 180 degrees, but are set to the same duty cycle value.

Thus, the controller 140 controls switches Q1-Q8 via signals S1, S2, S1*, and S2* to produce the output voltage 123. The controller 140 determines the duty cycle of control signals S1, S2, etc., based on an error voltage 315 derived from comparing a magnitude of the output voltage 123 to a setpoint reference voltage (Vref). The duty cycle maintains a magnitude of the output voltage 123 at the setpoint reference voltage Vref.

Thus, as shown in FIG. 3, the controller 140 can be configured to operate in a voltage mode control.

Note further that the power converter and corresponding controller 140 can be configured to operate in any suitable feedback control mode. For example, the controller 140 can be implemented to operate in a current mode control based on the controller 140 monitoring output current 124 supplied by the output voltage 123 to the load 118 such as based on detected: peak current, average current, valley current, etc., of the output current 124. In such an instance, the controller 140 controls states (such as duty cycle, etc.) of the switches Q1-Q8 depending on a comparison of a monitored output current 124 to a current setpoint value. Thus, further this disclosure includes determining the duty cycle based on monitoring a magnitude of output current 124 supplied by the output voltage 123 to the load 118.

Figure 4:
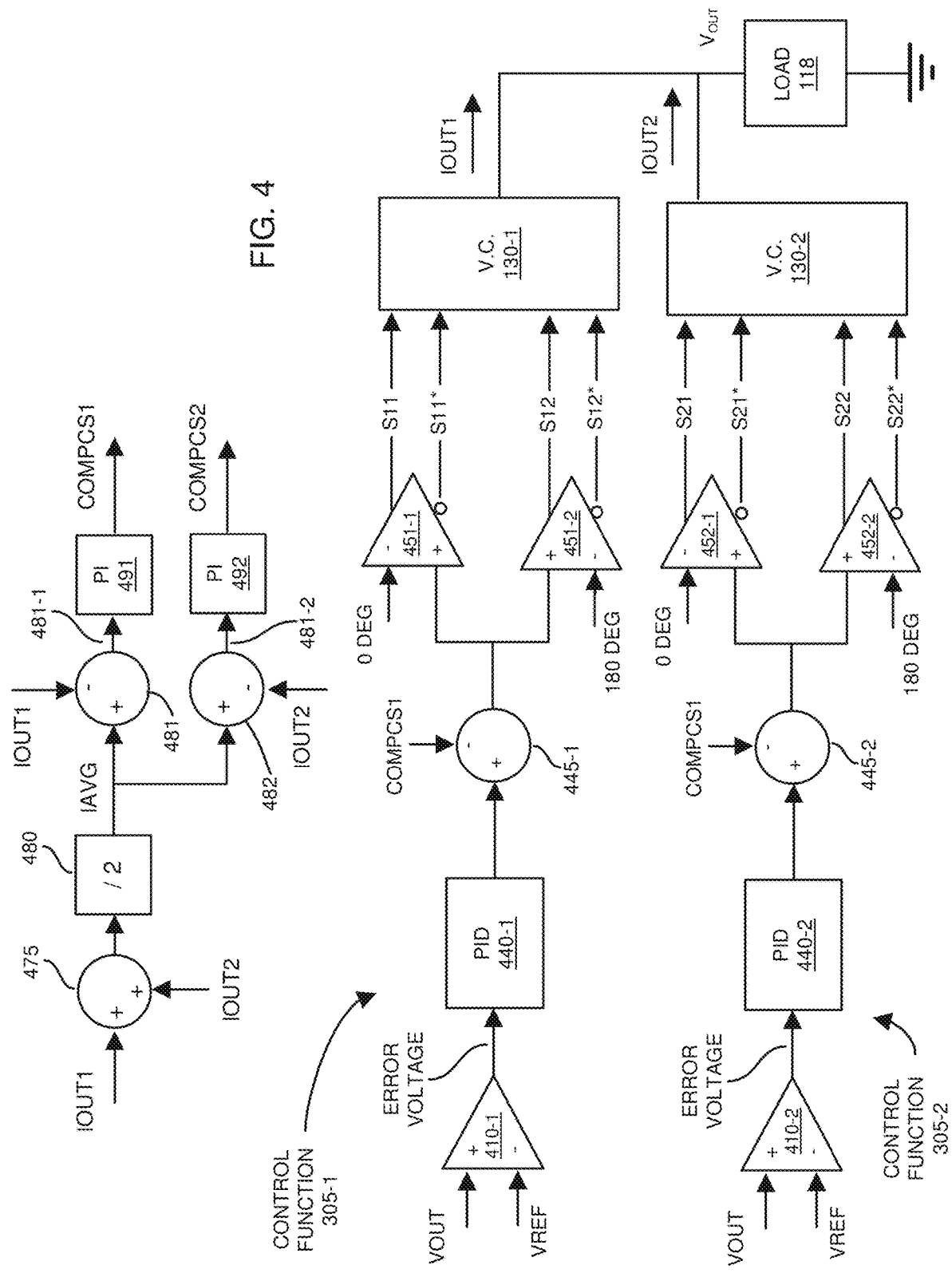
FIG. 4 is an example diagram illustrating a control signal generator as described herein.

FIG. 4 is an example diagram illustrating a control signal generator as described herein.

If high output power is required, multiple instances of the voltage converter (such as voltage converter 130-1, voltage converter 130-2, etc.) can be implemented to produce the output voltage 123. However, in such an instance, it may be desirable to implement a current sharing function as shown in FIG. 4 to balance current supplied by voltage converter 130-1 and voltage converter 130-2 to the load 118.

The current sharing loop as discussed herein processes the current error of each phase and modulates the duty-cycle of each voltage converter in such a way as to achieve the same or substantially equal output current from each voltage converter.

More specifically, in this example, summer 475 adds a magnitude of the current Iout1 and Iout2. Divider 480 divides the sum by 2 to produce an average current value Iavg. Difference function 481 produces error signal 481-1 indicating a difference between the average current Iavg and Iout1 supplied by the voltage converter 130-1 to the load 118. Difference function 482 produces error signal 482-1 indicating a difference between the average current Iavg and Iout2 supplied by the voltage converter 130-2 to the load 118.

Based on the error signal 481-1, the control function 491 (such as a PI controller, Proportional, Integral) produces the control signal COMPCS1. Based on the error signal 482-1, the control function 492 (such as a PI controller, Proportional, Integral) produces the control signal COMPCS2.

FIG. 4 further illustrates implementation of control function 305-1 and control function 305-2, each of which operates in a similar manner as previously discussed. The control signal COMPCS1 provides compensation with respect to generation of the respective control signals that drive voltage converter 130-1; the control signal COMPCS2 provides compensation with respect to generation of the respective control signals that drive voltage converter 130-2. In such an instance, the output current Iout1 from the voltage converter 130-1 is substantially equal to the output current Iout2 from voltage converter 130-2.

FIG. 5 is an example timing diagram illustrating control of multiple switches in a voltage converter when duty cycle is less than 50% as described herein.

As shown, during power conversion, the first flying capacitor CF1 stores a first voltage such as indicated by voltage $V_{Cfly1}$ network (signal 501); the second flying capacitor CF2 stores a second voltage $V_{cfly2}$ (signal 502). Switching operation of the network of switches 135 (such as switches Q1-Q8) controlled by control signals S1, S2, S1*, and S2* causes an average magnitude of the first voltage $V_{Cfly1}$ to be substantially equal to an average magnitude of the second voltage $V_{Cfly2}$ over time. The current 201-1 through the inductor 101-1 provides beneficial substantially equalization of an average magnitude of the first flying capacitor voltage VCfl1 and an average magnitude of the second flying capacitor voltage $Vc_{fly2}$, preventing unwanted drift in the magnitudes of the flying capacitor voltages.

The magnitude of the voltage 501 (a.k.a., flying capacitor voltage VCfly1) and the voltage 502 (a.k.a., flying capacitor voltage $V_{Cfly2}$) vary over time with respect to average voltage (input voltage $V_{in}/2$ threshold value). The conveyance of the energy from the first flying capacitor FC1 and the second flying capacitor FC2 to the inductor 144 over each of multiple control cycles of operating/controlling the network of switches 135 also helps to substantially equalize an average magnitude of the first voltage 501 to an average magnitude of the second voltage 502.

More specifically, as shown in FIG. 5, the magnitude of the voltage 501 increases slightly between time T0 and T1; the magnitude of the voltage 502 decreases slightly between time T0 and T1. The magnitude of the voltage 501 decreases slightly between time T4 and T5; the magnitude of the voltage 502 increases slightly between time T4 and T5.

Thus, this disclosure includes an implementation of a respective voltage converter 130 and corresponding inductor 101-2 that naturally equalizes average magnitudes, over a single control cycle (between T0 and T8) and each of multiple other subsequent control cycles, of a first flying capacitor voltage 501 and a second flying capacitor voltage 502.

As previously discussed, the network of switches 135 includes first switches and second switches. The controller 140 produces the control signals to regulate a magnitude of the output voltage 123 via controlling the network of switches 135 using a same duty cycle. In other words, the time difference between time T0 and time T1 (duty cycle D times the switching period Tsw, where Tsw=time between T0 and T8) operating in mode #1 (see FIG. 6) is equal to a time difference between time T4 and T5 (duty cycle, D, times the switching period Tsw, where Tsw=time between T0 and T8).

As previously discussed, the controller 140 determines the duty cycle D (ON time of signal S1 and ON-time of signal S2) based on an error voltage 315 derived from comparing a magnitude of the output voltage 123 to a setpoint reference voltage Vref (examples in FIG. 3 and FIG. 4).

Via generation of respective control signals, the controller 140 switches between multiple modes including one or more of: i) a first mode (mode #1 FIG. 6) in which the first flying capacitor FC1 and the second flying capacitor FC2 are connected in series between an input voltage 120 and ground reference (second voltage), the first flying capacitor FC1 is connected to the input voltage 120 while the second flying capacitor FC2 is connected to the ground reference; ii) a second mode (mode #2 in FIG. 7) in which the node 251 of inductor 144 is coupled to ground, iii) a third mode (mode #3 in FIG. 8) in which the second flying capacitor FC2 and the first flying capacitor FC1 are connected in series between an input voltage 120 and ground, the second flying capacitor FC2 being connected to the input voltage 120 while the first flying capacitor FC1 is connected to the ground reference node 251.

Figure 6:
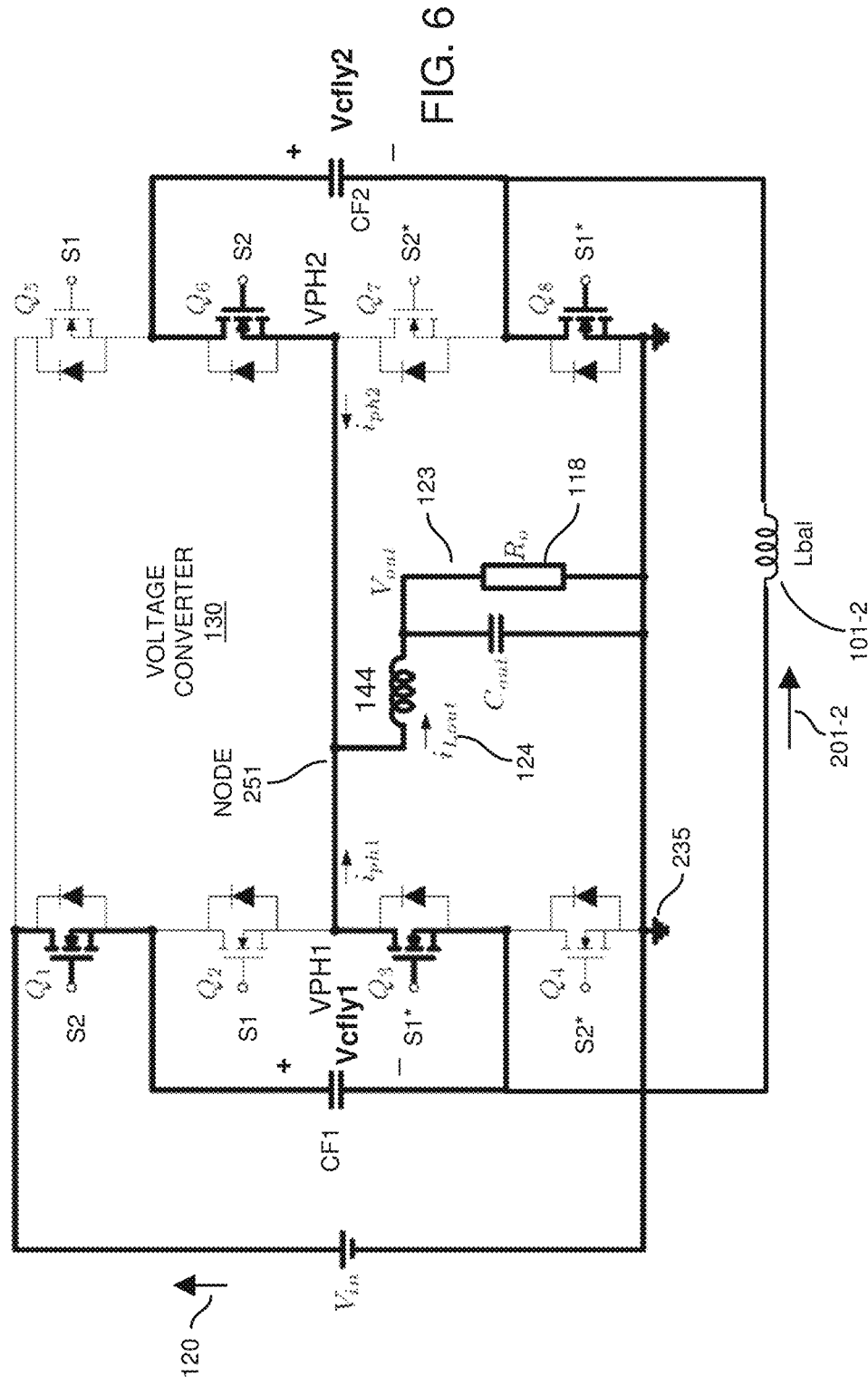
FIG. 6 is an example diagram illustrating operation of a regulated voltage converter in a first mode as described herein.

FIG. 6 is an example diagram illustrating operation of a regulated voltage converter in a first mode as described herein.

The network of switches 135 simultaneously supplies current iph1 from the first flying capacitor FC1 and current iph2 from the second flying capacitor FC2 to the inductor 144 that produces the output voltage 123.

Via the network of switches 135, coupling the first flying capacitor FC1 and the second flying capacitor FC2 in series between a first reference voltage (input voltage 120) and a second reference voltage (ground). The inductor 144 receives the first current iph1 and the second current iph2 at a node 251 coupling the first flying capacitor FC1 to the second flying capacitor FC2.

The controller 140 controls operation of the network of switches in mode #1 such that the first flying capacitor CF1 is charged, the second flying capacitor CF2 is discharged, and a magnitude of current 201-2 through the inductor 101-2 varies over time as shown in FIG. 5.

Figure 7:
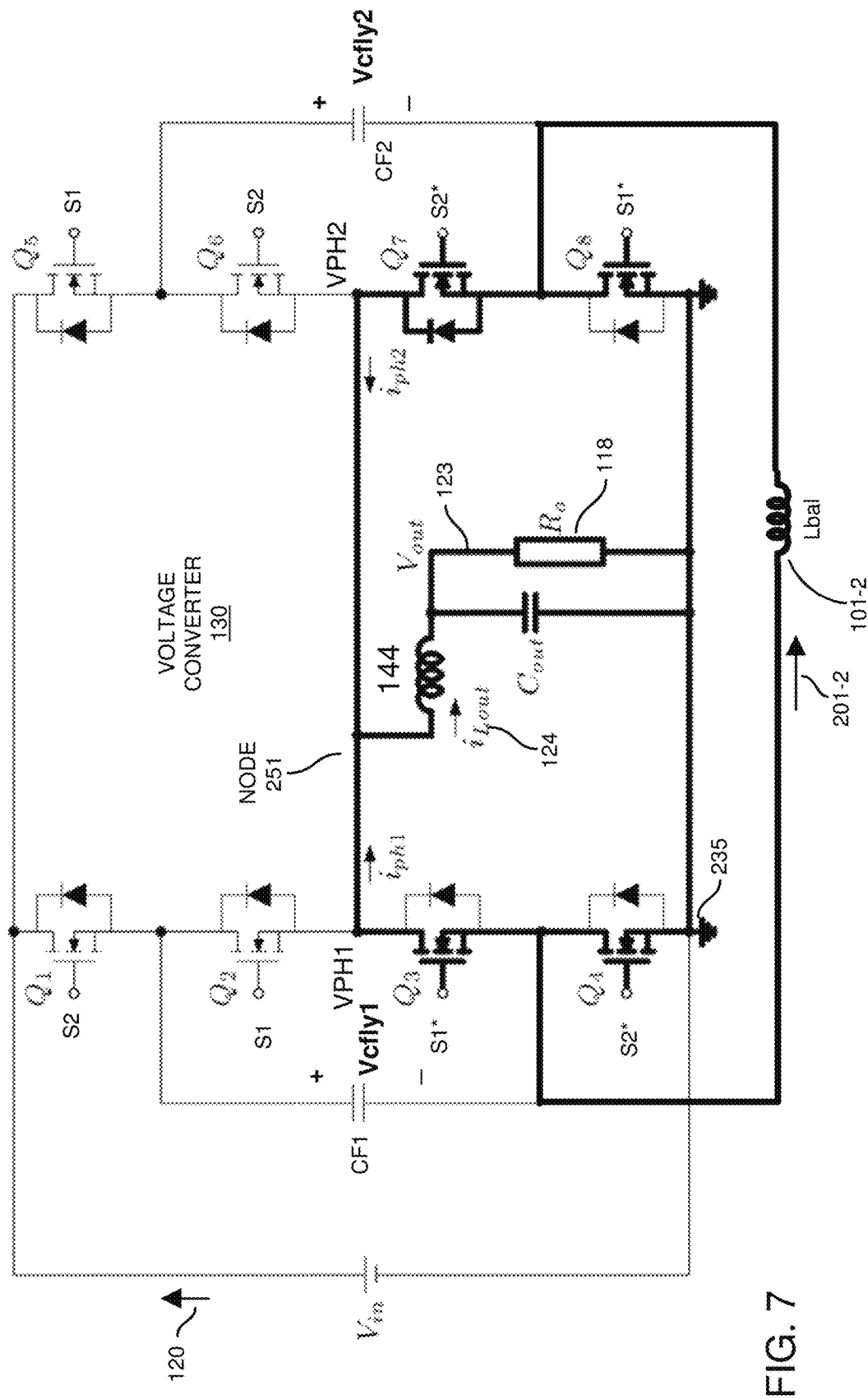
FIG. 7 is an example diagram illustrating operation of regulated voltage converter in a second mode as described herein.

FIG. 7 is an example diagram illustrating operation of regulated voltage converter in a second mode as described herein.

As shown, the controller 140 implements the second mode in which switches Q3, Q4, Q7, and Q8 are simultaneously activated. In such an instance, the ground reference supplies the current iph1 and current iph2 to the node 251 of the inductor 144. The controller 140 controls the network of switches in mode #3 in which: the first flying capacitor CF1 is neither charged or discharged and the second flying capacitor CF2 is neither charged nor discharged, and a magnitude of current 201-2 through the inductor 101-2 is constant as shown in FIG. 5.

Figure 8:
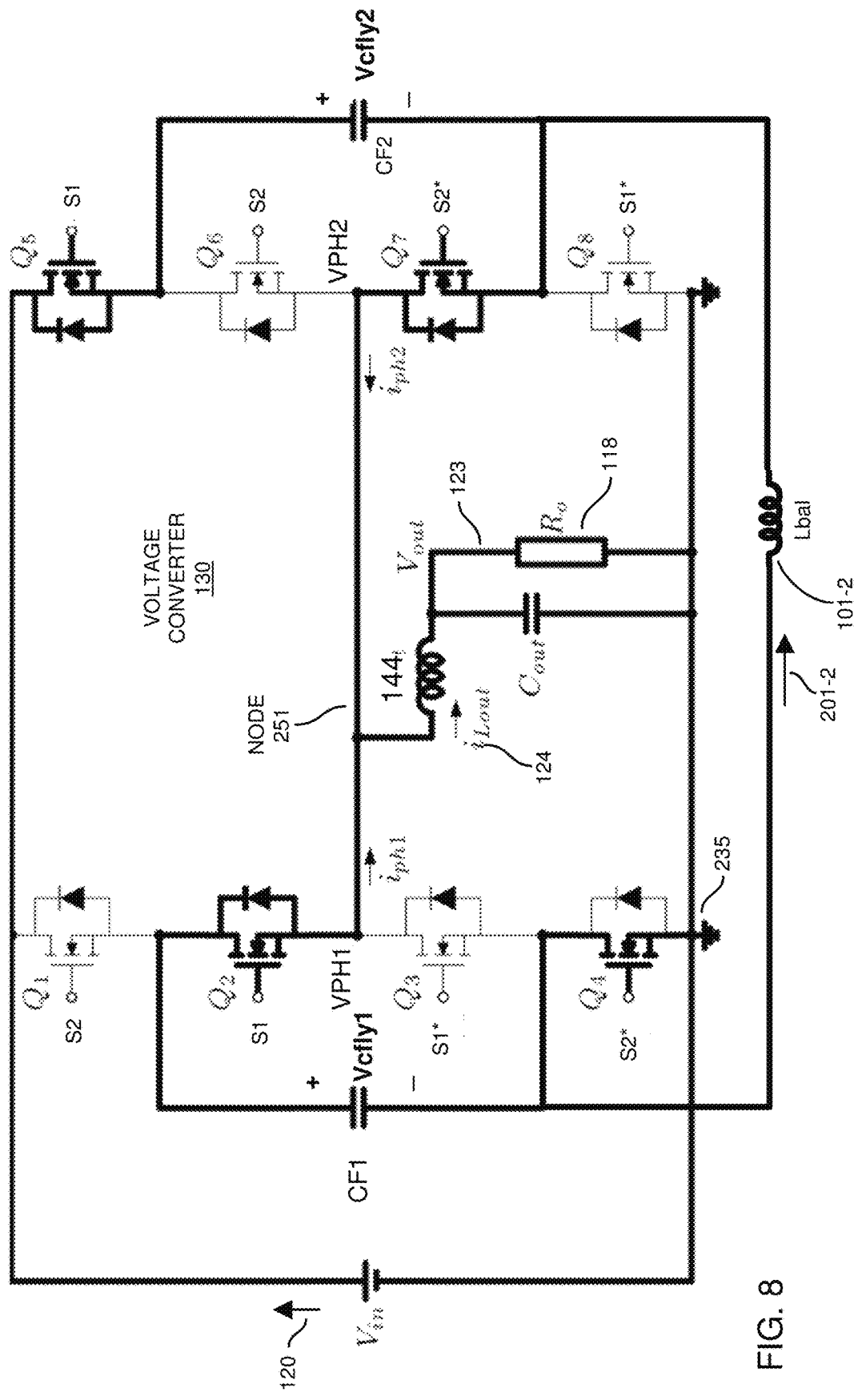
FIG. 8 is an example diagram illustrating operation of regulated voltage converter in a third mode as described herein.

FIG. 8 is an example diagram illustrating operation of regulated voltage converter in a third mode as described herein.

In general, the controller 140 controls operation of the network of switches in mode #3 such that the flying capacitor CF2 is charged, the flying capacitor CF1 is discharged, and a magnitude of current 201-2 through the inductor 101-2 varies over time as shown in FIG. 5.

Now, with reference to a combination of FIGS. 5, 6, 7, and 8.

Operation Modes of Three-Level Flying Capacitor Buck Converter

The controller 140 produces control signals as in timing diagram 500 of FIG. 5 based on conditions when the duty cycle is less than 50%.

1. Between $t_0$-$t_1$: (Mode #1), at $t=t_0$, the controller 140 activates switch $Q_1$ and $Q_6$ to an ON state. In mode #1, the flying capacitor $C_{fly1}$ (a.k.a., FC1) is charged from the input voltage 120 and is connected via switch $Q_3$ to the node phase $V_{ph1}$ powering the output inductance 144, whilst $C_{fly2}$ (a.k.a., FC2) is now discharging, powering the output inductance 144 such as $L_{out}$. The corresponding state of switches for mode #1 is shown in FIG. 6. In this mode #1, the output inductor 144 is powered from $V_{in}$-$V_{Cfly1}$ and from $Vc_{fly2}$ respectively from the drain node of switch $Q_3$ and the source pin of $Q_6$. During this mode, the flying capacitors are naturally forced to balance to an average value of $V_{in}/2$ since they are disposed in series between the input voltage 120 and the ground reference. However, the ripple on the flying capacitors (i.e., due to the load current (Ilout 124) from the inductor 144 and output capacitor Cout) leads to a reactive energy flowing between the two flying capacitors FC1 and FC2. Moreover, the drain voltage of $Q_4$ is equal to the voltage of flying capacitor FC2, which is $Vc_{fly2}$, whilst the other side of the balancing inductor 101-2 is clamped to the ground potential through switch $Q_8$ MOSFET. By considering the flying capacitor FC2 as constant generator with a value of $Vc_{fly2}$, during this phase, the balancing inductor current 101-2 rises from $-I_{Lbalpk}$ to $I_{Lbalpk}$ (a.k.a., between level TV1 and level TV2 between t0 and t1, peak negative value to peak positive value) with a slope of $V_{cfly2}/L_{bal}$, where Lbal is the inductance of inductor 101-2. Within this phase the two flying capacitor are naturally forced to average balance $V_{in}/2$ because of mainly two mechanism: the flying capacitors are connected in series from the input voltage 120 to the ground potential GND 235 (a.k.a., ground reference voltage) and from the balancing inductor current 201-2 associated with inductor 101-2. More details about the balancing mechanism will be discussed in the next section.

2. $t_1$-$t_2$: at $t=t_1$ Between T1 and T2 dead time, switches $Q_1$ and $Q_6$ are turned off 3. $t_2$-$t_3$: at $t=t_2$ (mode #2) after a dead-time period T dead from $t=t_1$, switch $Q_4$ and $Q_7$ are turned ON. In this mode #2 of FIG. 7, the output inductor 144 (having inductance Lout) is discharged with a slope of $V_{out}/L_{out}$, where Vout is output voltage 123. The two flying capacitors $C_{fly1}$ (a.k.a., FC1) and $C_{fly2}$ (a.k.a., FC2) are maintained at a stable voltage level respectively $V_{Cfly1}$ ($t_1$) and $V_{cfly2}$ ($t_1$). FIG. 7 shows a state of operating in mode #2.

4. $t_3$-$t_4$: at $t=t_3$ switch $Q_3$ and $Q_8$ are turned off. Note that between time $t_1$ and $t_4$, (a.k.a., mode #2) the magnitude of the inductor current 201-2 is constant at TV2 (peak positive value).

5. $t_4$-$t_5$: (mode #3) at $t=t_4$ after a dead-time period T dead from $t_3$ to $t_4$, the controller 140 activates switches $Q_2$ and $Q_5$ to an ON state. The flying capacitor $C_{fly2}$ (FC2) is charged from the input voltage 120 and is connected via switch $Q_7$ to the node phase $V_{ph2}$ powering the output inductor 144, whilst $C_{fly1}$ (FC1) is now discharging, powering the output inductance $L_{out}$. Operation in the mode #3 is shown in FIG. 8. In mode #3, the output inductor 144 is powered (receives energy) from $V_{in}$-$V_{Cfly1}$ and from VCfly2 respectively from the drain node of switch $Q_7$ and the source node of switch $Q_2$. During this mode, the flying capacitors are naturally forced to balance to an average voltage level of $V_{in}/2$ since they are connected in series between the input voltage 120 and the ground reference voltage. However, the ripple on the flying capacitors (i.e. due to the load current and the output inductance) leads for a reactive energy flowing between the two flying capacitors. By considering the flying capacitor FC1 as constant generator with a value of $V_{Cfly1}$ during this phase, the balancing inductor current 201-2 falls from $I_{Lbalpk}$ to $-I_{Lbalpk}$ with a slope of $V_{fly2}/L_{bat}$. Within this phase the two flying capacitor are naturally forced to balance $V_{in}/2$ because of mainly two mechanism: the flying capacitors are connected in series from the input voltage 120 to the ground potential 235 and from the balancing inductor 101-2. More details about the balancing mechanism will be discussed in the next section.

6. $t_5$-$t_6$: at $t=t_5$ switch $Q_5$ and $Q_2$ are turned off.

7. $t_6$-$t_7$: at $t=t_6$ after a dead-time period T dead from $t=t_5$ switches $Q_8$ and $Q_3$ are turned on. In this mode (phase), the output inductor 144 is discharged with a slope of $V_{out}/L_{out}$. The two flying capacitors $C_{fly1}$ and $C_{fly2}$ are maintained at a stable voltage level respectively $V_{Cfly1}$ ($t_5$) and $V_{cfly2}$ ($t_5$). The circuit state is now shown in FIG. 7.

8. $t_7$-$t_8$: at $t=t_7$ switch $Q_4$ and $Q_7$ are turned off. At $t=t_8$ switch $Q_1$ and $Q_6$ are turned on which correspond with one-cycle of the switching period Tsw. Note that between time $t_5$ and $t_8$, (a.k.a., mode #2) the magnitude of the inductor current 201-2 is constant at TV1 (peak negative value).

Natural Balancing in Dual-Phase 3LFC Buck Converter

As explained in the previous section the proposed voltage converter 130 and corresponding inductor 101 presents a natural balancing of the two flying capacitor forming the 3LFC-DP converter, meaning that under non-ideal behavior of the converter (i.e. not ideal drivers and control system, differences between power switches (such as MOSFETs), temperature differences within the board and component mismatch) the flying capacitors voltages are kept stable to approximately half of the input voltage $V_{in}/2$.

There are mainly two mechanism, which are balancing the flying capacitor voltages. The first one is due to the connection of the two midpoints of the 3LFC-DP legs, where, due to the phase node shorted the following equation is always valid:

$$V_{in}=V_{Cfly1}+V_{Cfly2}. \qquad (1)$$

However, alone, the connection of the two midpoints (the flying capacitors are connected in series during the subintervals t0-t1 and t4-t5 does not guarantee the flying capacitors balance under all mismatch conditions, therefore is necessary to enforce the balancing action with an inductive component. The inductive component 101 can be placed either between the drain node of $Q_4$ and $Q_8$, or between the drain node of $Q_2$ and $Q_6$.

For sake of explanation is considered the case where the balancing inductor 101 is placed between the drain node of $Q_4$ and $Q_8$.

As previously discussed, this disclosure introduces a balancing action between a two phases three level buck converter sharing the phase node having an inductive action to balance the two flying capacitor voltages. As previously discussed, the drain voltage of $Q_4$ in its off state is reported the voltage of flying capacitor FC2, whilst when $Q_8$ is in its off state is reported the voltage of flying capacitor FC1. By considering that $Q_4$ is controlled by $\Phi p$, whereas $Q_8$ is controlled by $\bar{q}_a(S1^*)$ and considering the flux balancing of the balancing inductor 101-2 or $L_{bal}$ the following equation is valid:

$$\frac{V_{Cfly2}}{V_{Cfly1}} = \frac{T_{on_{\overline{\Phi_a}}}}{T_{on_{\overline{\Phi_b}}}} \qquad (2)$$

by combining equation (1) and (2) and considering $T_{on_{\overline{\Phi_a}}} = T_{on_{\overline{\Phi_b}}}$ if follows that the average voltage of $V_{Cfly2}$ equals to $V_{Cfly1}$. Similar equation can be found also for the circuit in FIG. 2, where as well it guarantees that the average voltage of $V_{Cfly2}$ equals to $V_{Cfly1}$. By considering the control system proposed in FIG. 3 it is clear how $T_{on_{\overline{\Phi_a}}}$ cannot be considerably different from $T_{on_{\overline{\Phi_b}}}$ and therefore the proposed approach guarantees with a simple but effective method to balance the flying capacitors of a three level buck converter dual-phase with a common phase node sharing same output inductance.

Note that the compensation method is valid because the system is symmetrical (i.e. two three level buck converter sharing a powering node phase shifted by) 180° since exploit the presence of a symmetrical behavior. Note further that the inductive component (inductor 101) inserted in the circuit does not carry any energy to the output load.

Figure 9:
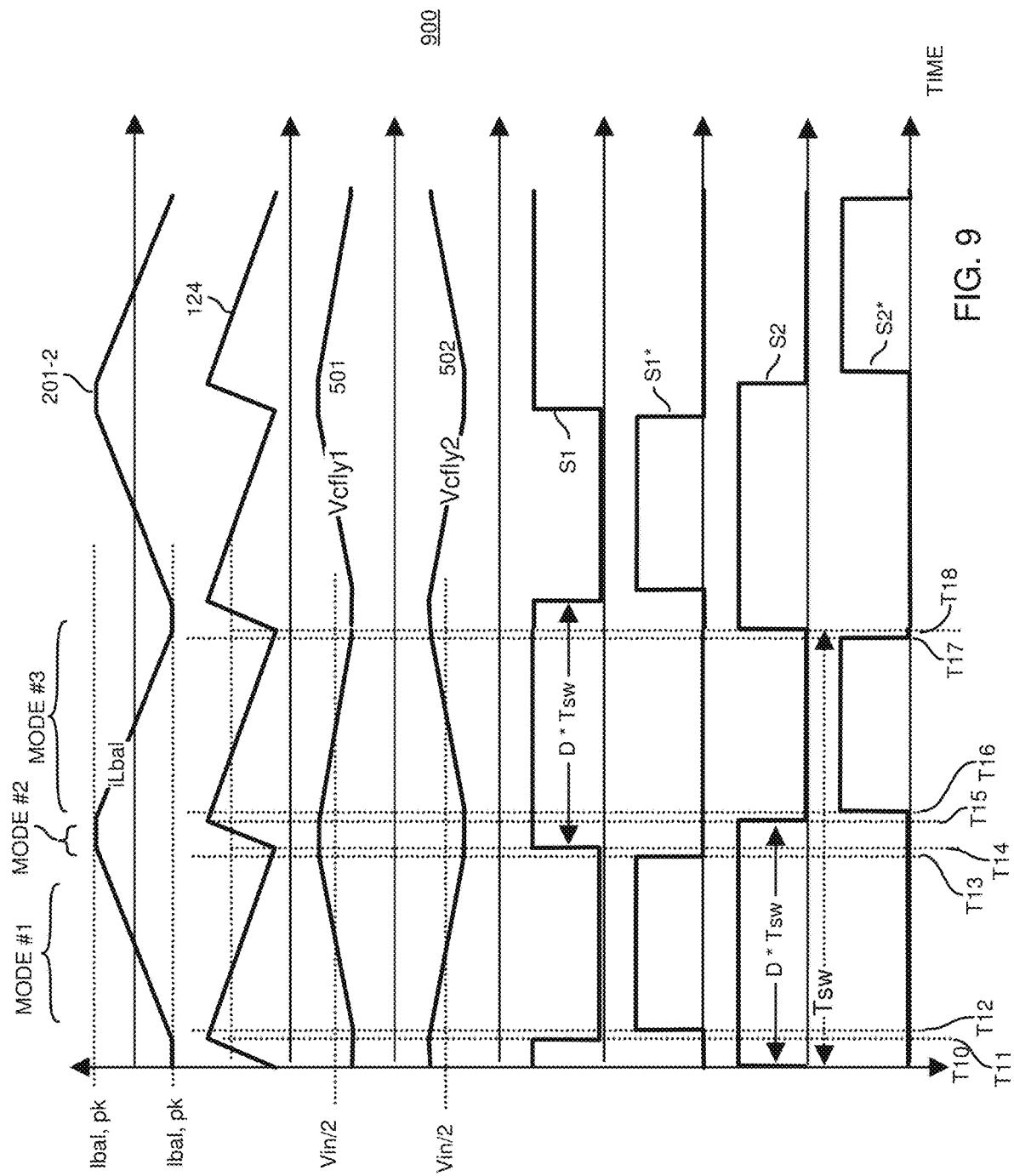
FIG. 9 is an example timing diagram illustrating control of multiple switches in a voltage converter as described herein.

FIG. 9 is an example timing diagram illustrating control of multiple switches in a voltage converter as described herein. Duration Tsw between T10 and T18 represents a control cycle that is repeated over time to control the output voltage 123.

Similar Operation Modes can be Described with Duty-Cycle Above 50%:
1. $t_{10}$-$t_{11}$: at t=$t_{10}$ switch $Q_1$ and $Q_6$ are turned on, in this phase the output inductance is charged with a slope of $(V_{in}-V_{out})/L_{out}$. The two flying capacitors FC1 and FC2 are kept to a stable voltage level respectively $V_{Cfly1}$ ($t_{10}$) and $V_{cfly2}$ ($t_{10}$). During this phase the current inside the balancing inductor flows between the flying capacitors and the $Q_1$ and $Q_5$, keeping a stable (constant voltage) value at $-I_{L_{bal,pk}}$. The topological state is now shown in FIG. 10.
2. $t_{11}$-$t_{12}$: at t=$t_{11}$ switch $Q_2$ and $Q_5$ are turned off.
3. $t_{12}$-$t_{13}$: at t=$t_{12}$ after a dead-time period $T_{dead}$ from t=$t_{11}$ switch $Q_8$ and $Q_3$ are turned on, in this phase, the output inductance 144 (a.k.a., Lout) is discharged with a slope of $(V_{out}-V_{Cfly2})/L_{out}$. The flying capacitor FC1 now is charged from the input and is connected with $Q_3$ to the node phase VPH1 powering the output inductance 144, whilst FC2 is now discharging, powering the output inductance $L_{out}$. During this phase, the flying capacitors are connected in series from the input voltage Vin to the ground voltage GND. Moreover the drain voltage of $Q_4$ is equal to the voltage of flying capacitor FC2 which is $Vc_{fly2}$, whilst the other side of the balancing inductor 101-2 is clamped to the ground potential through switch $Q_8$. By considering the flying capacitor FC2 as constant generator with a value of $Vc_{fly2}$, during this phase, the balancing inductor current 201-2 rises from $-I_{L_{bal,pk}}$ to $I_{L_{bal,pk}}$ with a slope of $V_{fly2}/L_{bal}$. Within this phase, the two flying capacitors are naturally forced to balance around $V_{in}/2$ because of mainly two mechanism: the flying capacitors are connected in series from the input voltage to the ground potential GND and from the balancing inductor 101-2. More details about the balancing mechanism will be discussed in the next section. The topological state is shown in FIG. 6.
4. $t_{13}$-$t_{14}$: at t=$t_{13}$ switch $Q_3$ and $Q_8$ are turned off.
5. $t_{14}$-$t_{15}$: at t=$t_{14}$ after a dead-time period $T_{dead}$ from t=$t_{14}$, switch $Q_2$ and $Q_5$ are turned on; in this phase the output inductance 144 is charged with a slope of $(V_{in}-V_{out})/L_{out}$. The two flying capacitors FC1 and FC2 are kept to a stable voltage level respectively $V_{Cfly1}$ ($t_{14}$) and $V_{cfly2}$ ($t_{14}$). During this phase the current inside the balancing inductor flows between the flying capacitors and the switches $Q_1$ and $Q_5$ keeping a stable value at $I_{L_{bal,pk}}$. The topological state (mode #4) is now shown in FIG. 10.
6. $t_{15}$-$t_{16}$: at t=$t_{15}$ switches $Q_1$ and $Q_6$ are turned off.
7. $t_{16}$-$t_{17}$: at t=$t_{16}$ after a dead-time period $T_{dead}$ from t=$t_{16}$ switch $Q_4$ and $Q_7$ are turned on, in this phase the output inductance is discharged with a slope of $(V_{out}-V_{fly1})/L_{out}$. The flying capacitor FC2 is charged from the input and is connected with $Q_7$ to the node phase VPH2 powering the output inductance 144, whilst capacitor FC1 is now discharging, powering the output inductance Lout (a.k.a., inductor 144). By considering the flying capacitor FC1 as constant voltage generator (voltage source) with a value of voltage $V_{Cfly1}$ during this phase, the balancing inductor current falls from ILbal,pk to $-L_{bal,pk}$ with a slope of $V_{fly1}/L_{bal}$. Within this phase, the two flying capacitor are naturally forced to balance to average voltage of $V_{in}/2$ because of mainly two mechanism: the flying capacitors are connected in series from the input voltage to the ground potential GND and from the balancing inductor 101-2. More details about the balancing mechanism will be discussed in the next section. The topological state is shown in FIG. 8.
8. $t_{17}$-$t_{18}$: at t=$t_{17}$ switch $Q_4$ and $Q_7$ are turned off. At t=$t_{18}$ switch $Q_1$ and $Q_6$ are turned on which correspond with one-cycle of the switching period Tsw.

Figure 10:
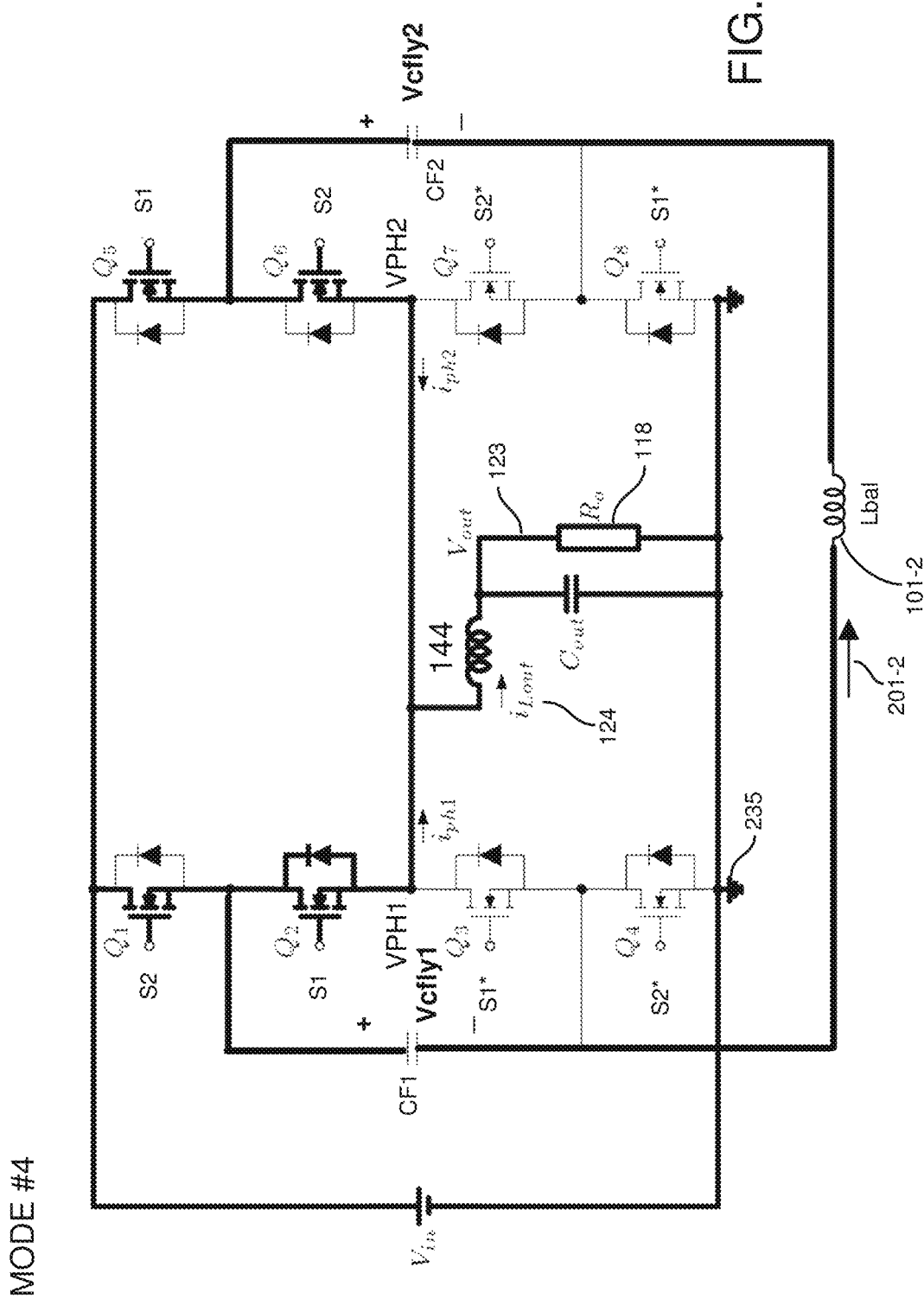
FIG. 10 is an example diagram illustrating operation of a regulated voltage converter in a fourth mode as described herein.

FIG. 10 is an example diagram illustrating operation of a regulated voltage converter in a fourth mode as described herein.

As previously discussed, FIG. 10 illustrates activation of switches $Q_1$, $Q_2$, $Q_5$, and $Q_6$ during mode #4. This connects the input voltage 120 to the inductor 144 via a respective low impedance switch path, resulting in an increase in a magnitude of the output current 124 through inductor 144 to the load 118.

Figure 11:
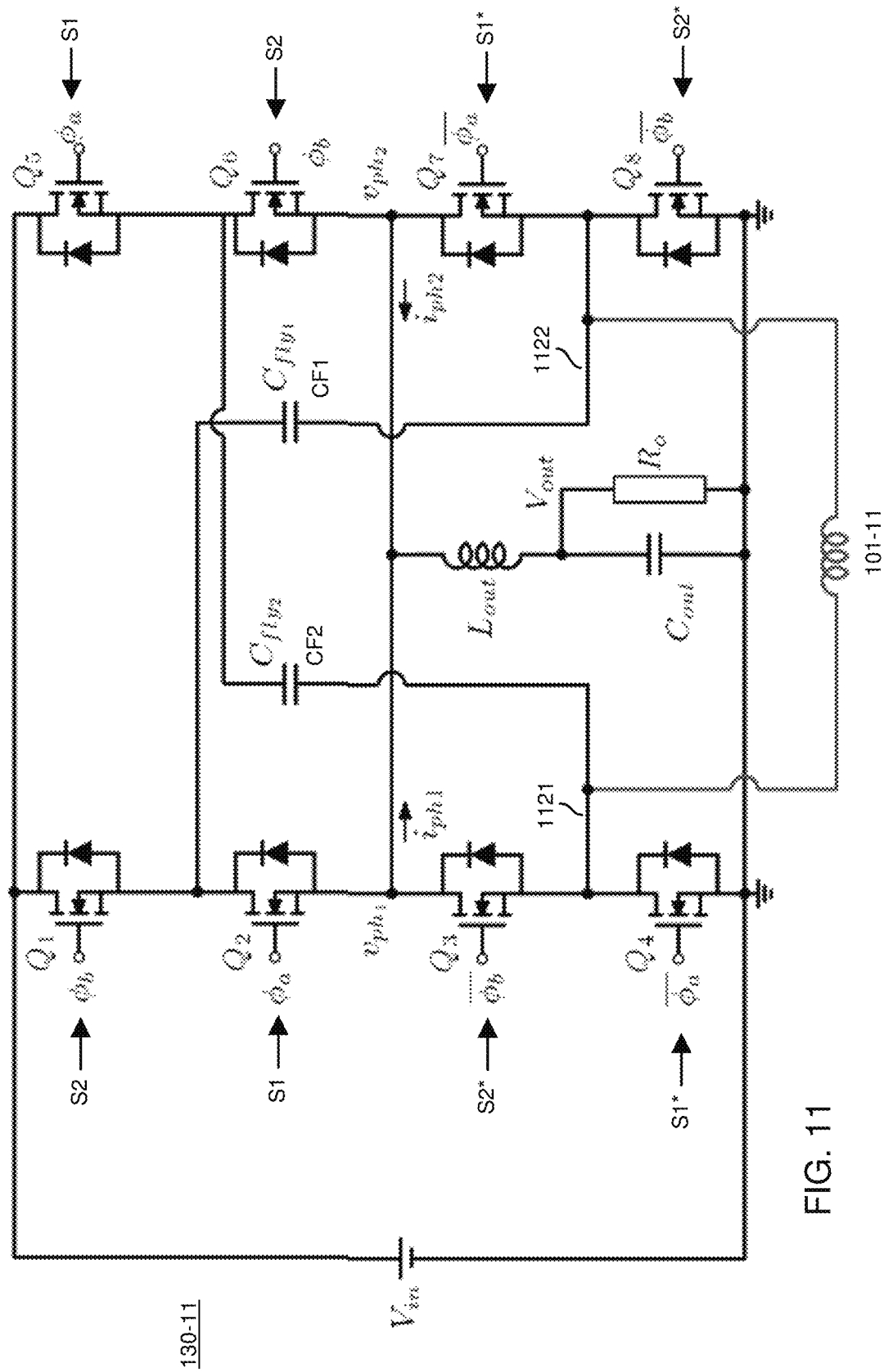
FIG. 11 is an example diagram illustrating a multilevel flying capacitor buck dual-phase converter with flying capacitors cross-connected as discussed herein.

FIG. 11 is an example diagram illustrating a multilevel flying capacitor buck dual-phase converter with flying capacitors cross-connected as discussed herein.

The voltage converter 130 as previously discussed can be implemented with cross-connected flying capacitors CF1 and CF2 as well as corresponding voltage balancing inductor.

The voltage converter 130-11 shown in FIG. 11 can be useful to reduce mismatch between the two multi-level half bridge present in the voltage converter 130-11. As shown, the balancing inductor 101-11 is placed between the drain node 1121 of switch $Q_4$ and drain node 1122 of switch $Q_8$.

Figure 12:
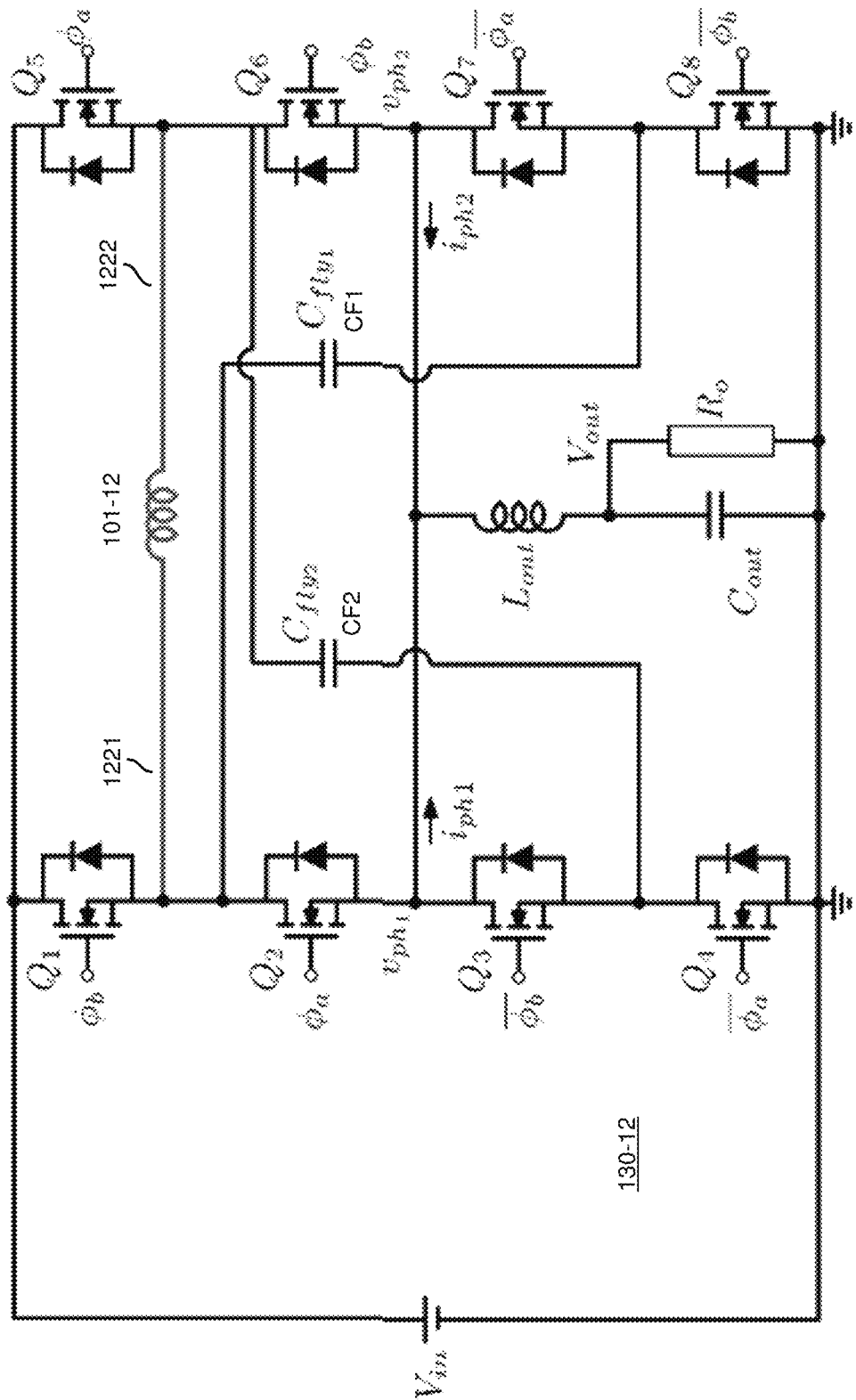
FIG. 12 is an example diagram illustrating a multilevel flying capacitor buck dual-phase converter with flying capacitors cross-connected as discussed herein.

FIG. 12 is an example diagram illustrating a multilevel flying capacitor buck dual-phase converter with flying capacitors cross-connected as discussed herein.

The voltage converter 130 as previously discussed can be implemented with cross-connected flying capacitors CF1 and CF2 as well as corresponding inductor.

The voltage converter 130-12 shown in FIG. 12 can be useful to reduce mismatch between the two multi-level half bridges present in the voltage converter 130-12. The balancing inductor 101-12 is placed between the drain node 1221 of switch $Q_2$ and drain node 1222 of switch $Q_6$.

Figure 13A:
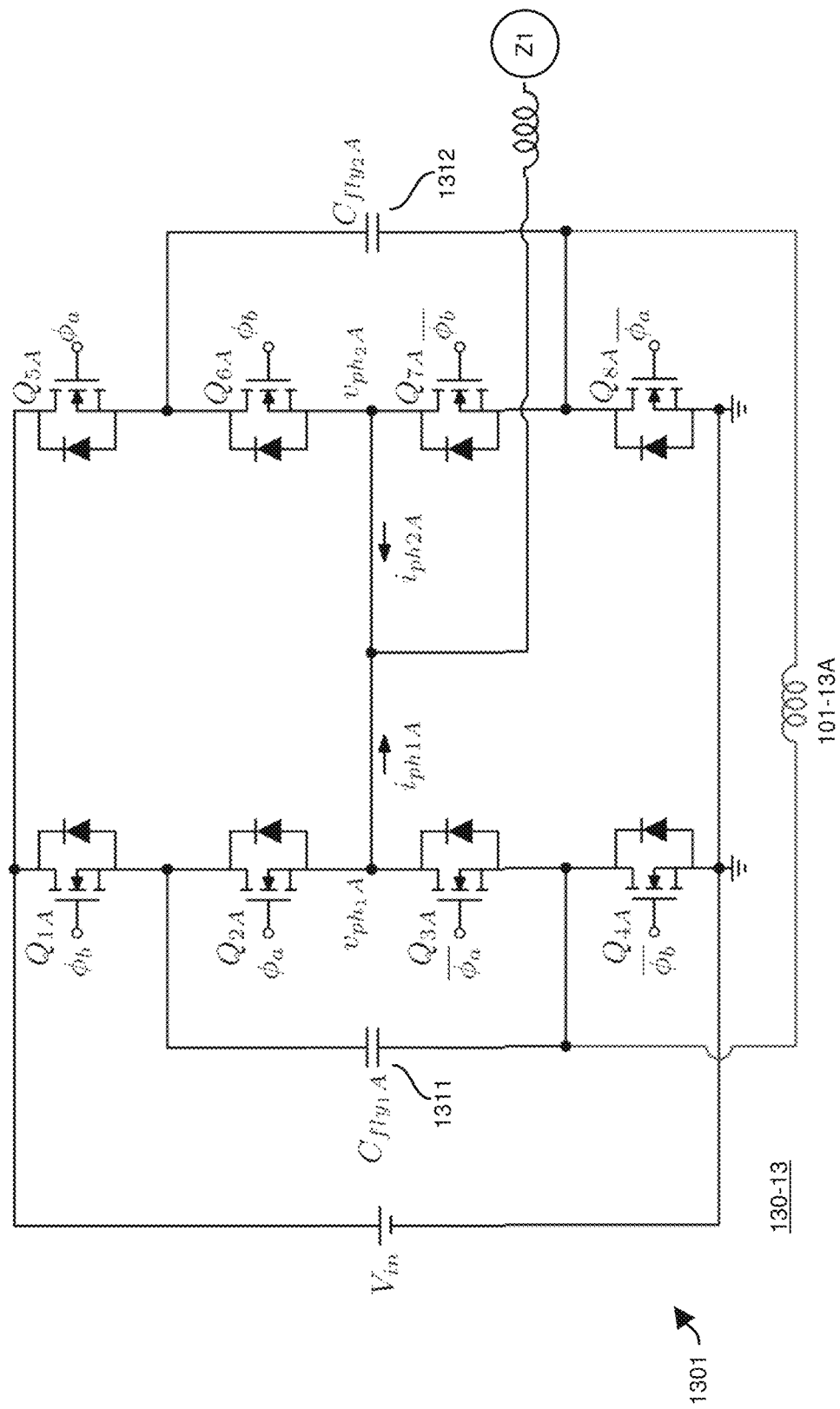
FIGS. 13A and 13B are example diagrams illustrating a three level flying capacitor buck-boost dual-phase converter as discussed herein.
Figure 13B:
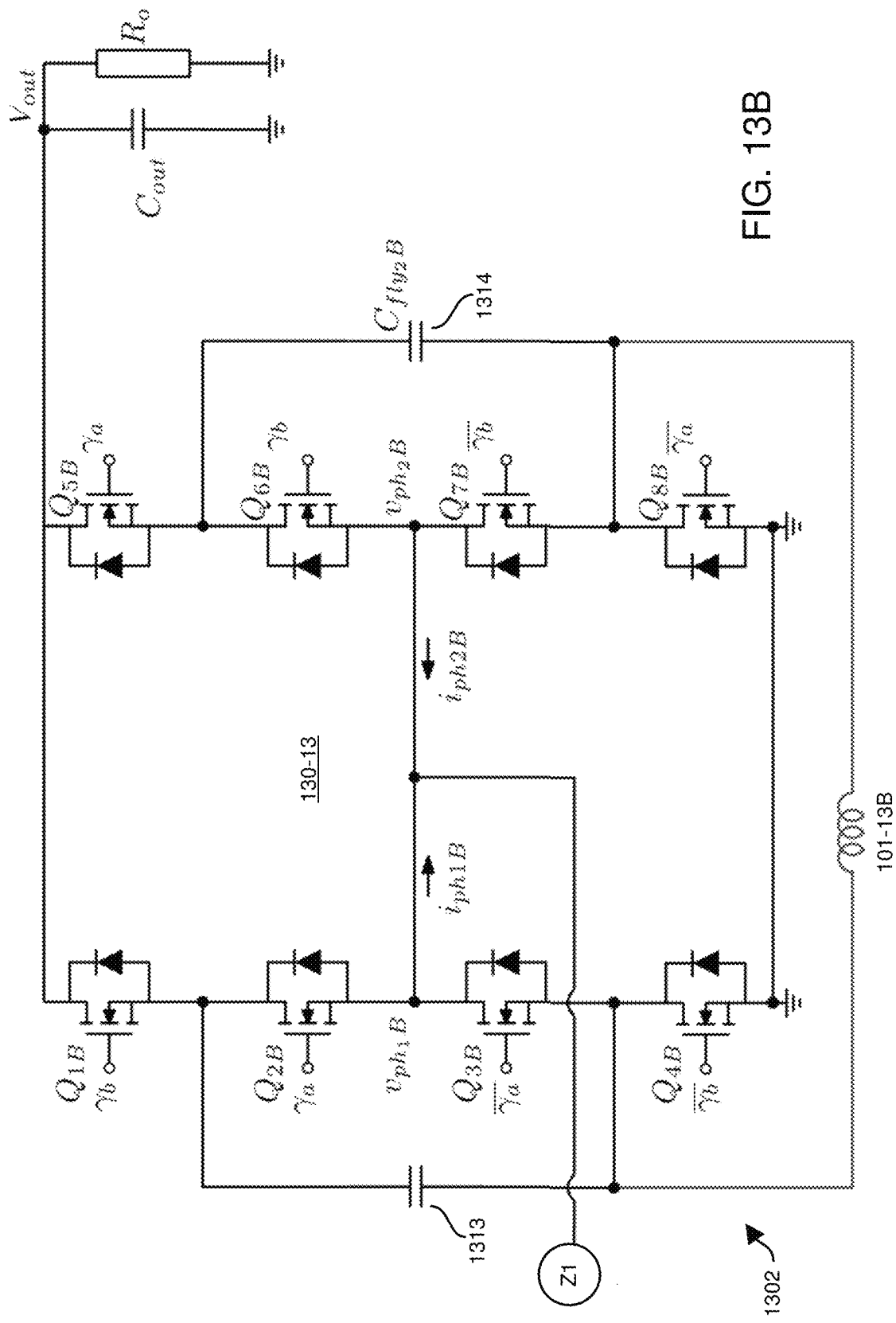

FIGS. 13A and 13B are example diagrams illustrating a three level flying capacitor buck-boost dual-phase converter as discussed herein.

The balancing method as discussed herein via one or more inductors can be extended to any one or more converter topologies that regulate the output voltage with one or more voltage balancing inductors. These systems may have a multi-level structure, basically the power node will experience N voltage levels where N>2.

Moreover, as previously mentioned, such systems may exploit the presence of symmetrical behavior to allow the use of the balancing inductor. In general such configuration will guarantee that the nominal operating voltage of flying capacitors and switches is respected.

In this example, a possible configuration having a buck-boost multilevel converter incorporating the balancing inductor concept is proposed. Similarly, as done for the buck-boost multilevel, the balancing concept can be extended to a boost version and to a buck or boost N levels version.

Two balancing inductors (namely, inductor 101-13A and 101-13B) may be used to automatically balance the flying capacitor voltages of a three-level, two-phase flying capacitor buck-boost converter (buck portion shown in FIG. 13A, boost portion shown in FIG. 13B). This converter 130-13 is the combination of a single-level, two-phase buck converter and a boost counterpart, with the output inductor connected in-between. The balancing inductors can be connected between the two voltage domains shown in FIGS. 13A and 13B. Thus, the voltage converter 130-13 may be a three level flying capacitor buck-boost dual-phase (3LFCBB-DP) converter with two balancing inductors such as inductor 101-13A connected between the drain nodes of switch $Q_4A$ and switch $Q_8A$ and inductor 101-13B connected between the drain nodes of between switch $Q_4B$ and switch $Q_8B$.

Thus, a combination of the first flying capacitor 1311, the second flying capacitor 1312, the first inductor 101-13A and the first network of switches $Q_1A$ to $Q_8A$ is disposed in a first flying capacitor power converter stage 1301 (FIG. 13A). A second flying capacitor power converter stage 1302 (FIG. 13B) includes: a third flying capacitor 1313 to store a third flying capacitor voltage; a fourth flying capacitor 1314 to store a fourth flying capacitor voltage; a second inductor 101-13B providing coupling between the third flying capacitor and the fourth flying capacitor; and a second network of switches operative to produce a second output voltage (Vout) via the third flying capacitor voltage and the fourth flying capacitor voltage.

Figure 14A:
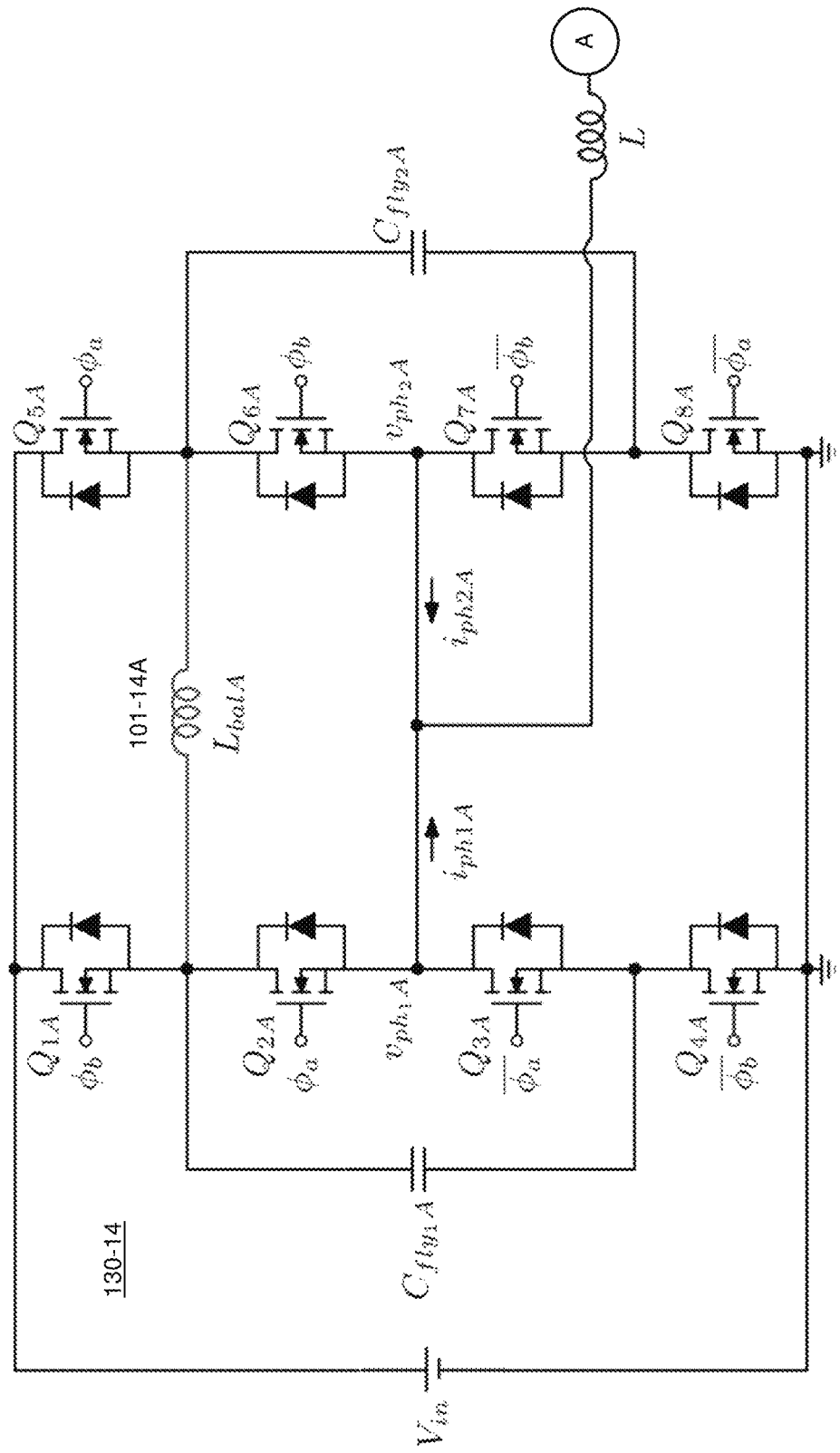
FIGS. 14A and 14B are example diagrams illustrating a three level flying capacitor buck-boost dual-phase converter as discussed herein.
Figure 14B:
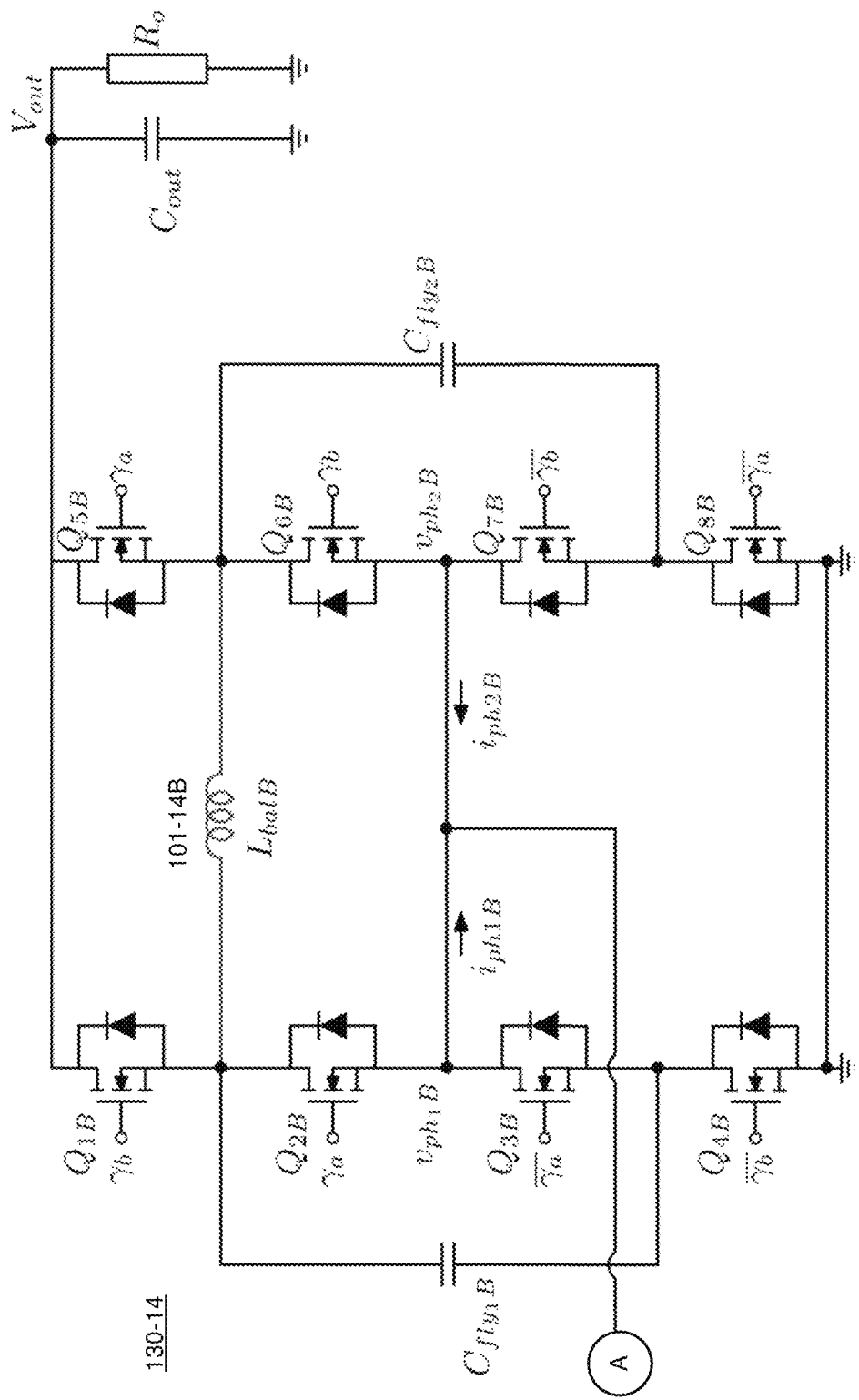

FIGS. 14A and 14B are example diagrams illustrating a three level flying capacitor buck-boost dual-phase converter as discussed herein.

In this example of the voltage converter 130-14, the three level flying capacitor buck-boost dual-phase (3 LFCBB-DP) converter includes two balancing inductors. One inductor 101-14A is connected between the drain node of switch $Q_2A$ and drain node of switch $Q_6A$; another inductor 101-14B is connected between the drain node of switch $Q_2B$ and drain node of switch $Q_6B$.

Figure 15:
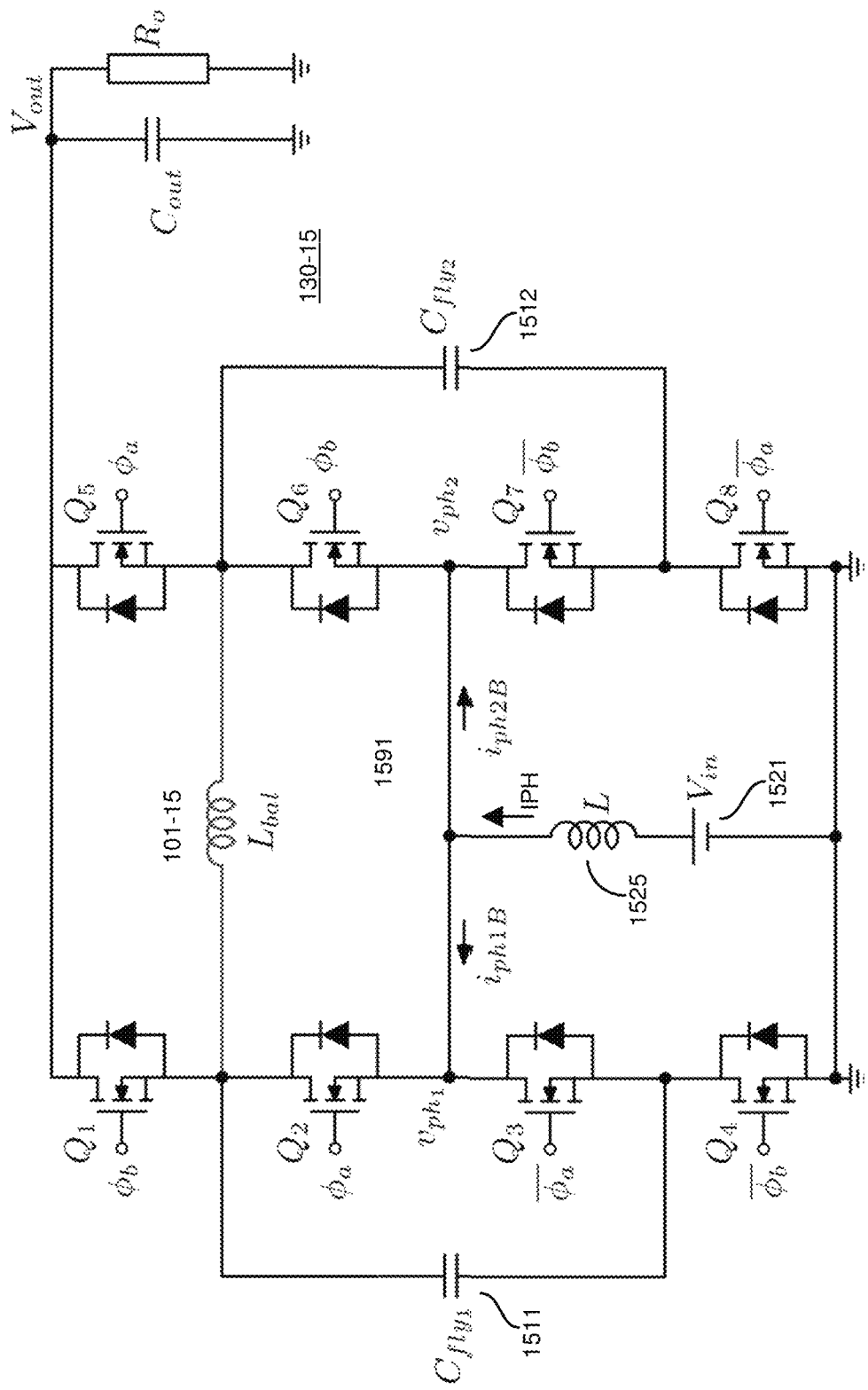
FIG. 15 is an example diagram illustrating a three level flying capacitor boost dual-phase converter as discussed herein.

FIG. 15 is an example diagram illustrating a three level flying capacitor boost dual-phase converter as discussed herein.

In this example, one balancing inductor 101-15 may be used to automatically balance the flying capacitor voltages of voltage converter 130-15 such as a three-level, two-phase flying capacitor boost converter. The inductor 101-15 of the example boost dual-phase (3 LFCBB-DP) converter is connected between the drain node of switch $Q_2$ and the drain node of switch $Q_6$.

Thus, in this example, the inductor 101-15 provides voltage balancing between the first flying capacitor 1511 and the second flying capacitor 1512; the network of switches $Q_1$-$Q_8$ includes a first sequence of switches $Q_1$ to $Q_4$ connected in series and a second sequence of switches $Q_5$ to $Q_8$ connected in series. An input inductor 1525 connected between an input voltage source 1521 and the electrically conductive path 1591. The input inductor 1525 receives input current from the input voltage source 1521 and supplies the input current iph to the electrically conductive path 1591.

Figure 16:
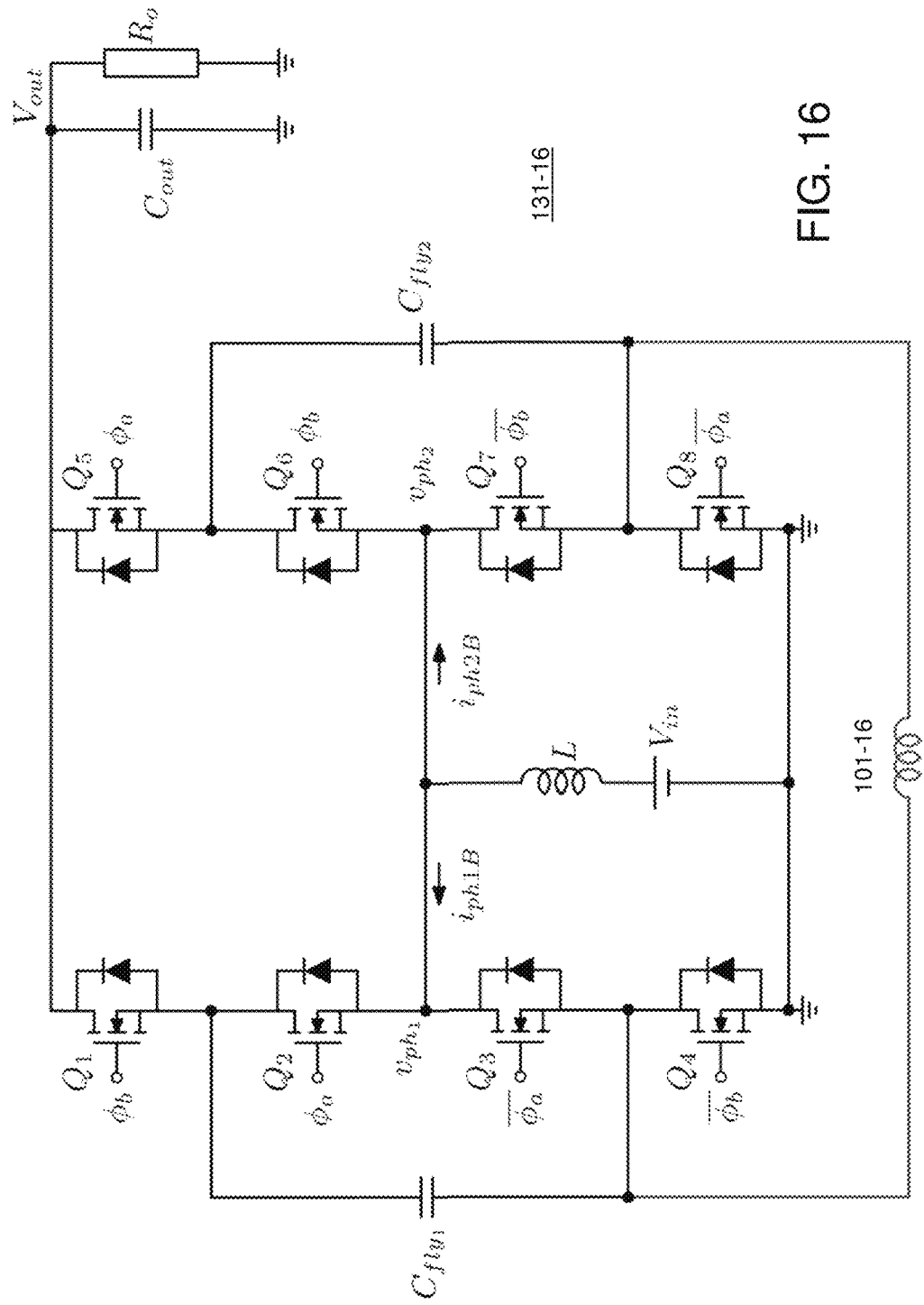
FIG. 16 is an example diagram illustrating a three level flying capacitor boost dual-phase converter as discussed herein.

FIG. 16 is an example diagram illustrating a three level flying capacitor boost dual-phase converter as discussed herein.

In this example, one balancing inductor 101-16 may be used to automatically balance the flying capacitor voltages of voltage converter 130-16 such as a three-level, two-phase flying capacitor boost converter. The inductor 101-16 of the example boost dual-phase (3 LFCBB-DP) converter is connected between the drain node of switch $Q_4$ and the drain node of switch Q8.

Figure 17:
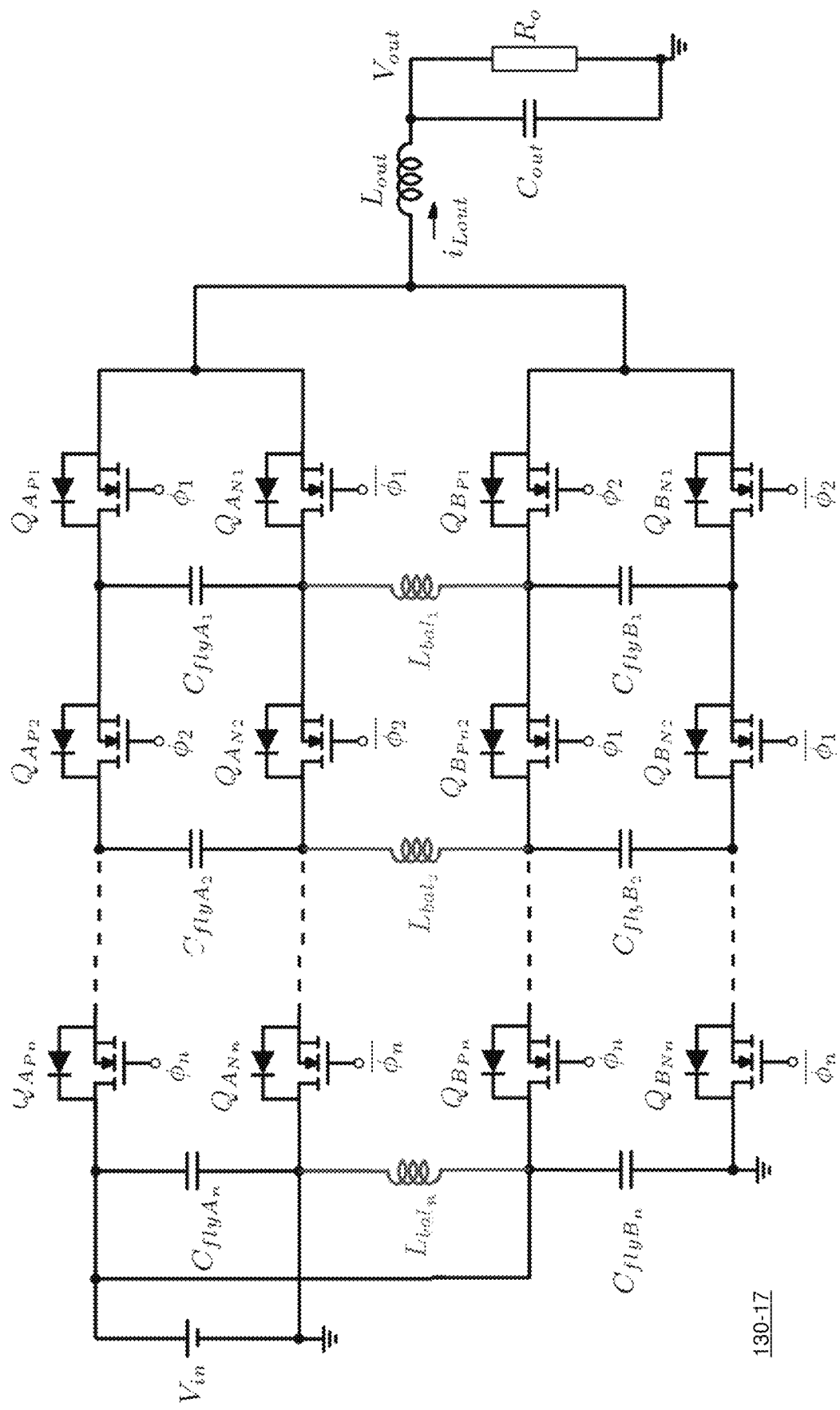
FIG. 17 is an example diagram illustrating an N-level flying capacitor buck dual-phase converter as discussed herein.
Figure 18:
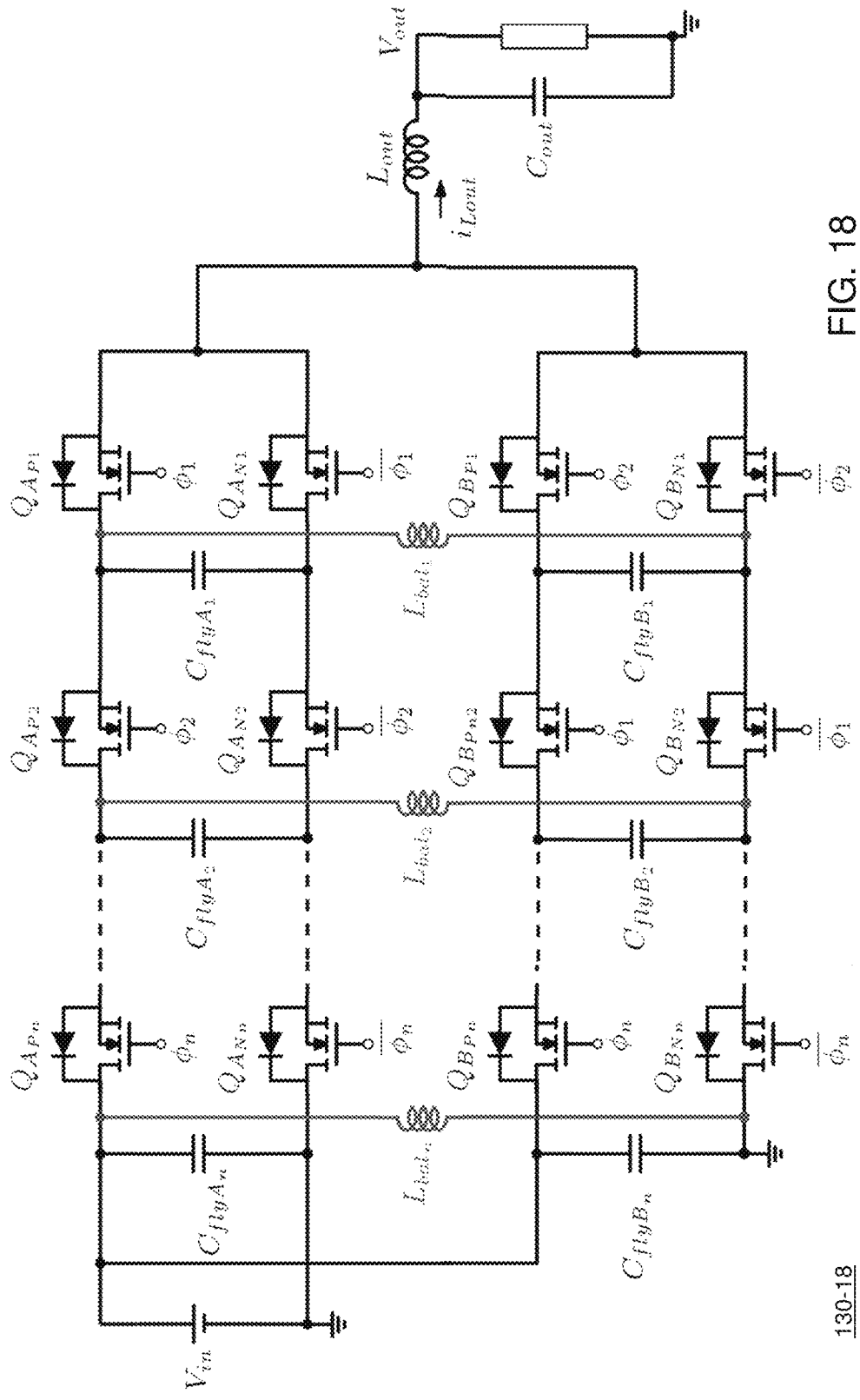
FIG. 18 is an example diagram illustrating a N-level flying capacitor buck dual-phase converter as discussed herein.

FIG. 17 is an example diagram illustrating an N-level flying capacitor buck dual-phase converter as discussed herein. FIG. 18 is an example diagram illustrating a N-level flying capacitor buck dual-phase converter as discussed herein.

In FIGS. 17 and 18 are shown reported a configuration of N level buck converter where two multi-level bridges are sharing the same phase node (i.e. powering an inductor). As shown, the balancing inductors can be implemented at each level of an N level converter 130-17 in FIG. 17. Moreover, such compensation method can be also extended to an N level boost converter 130-18 as shown in FIG. 18.

Figure 19:
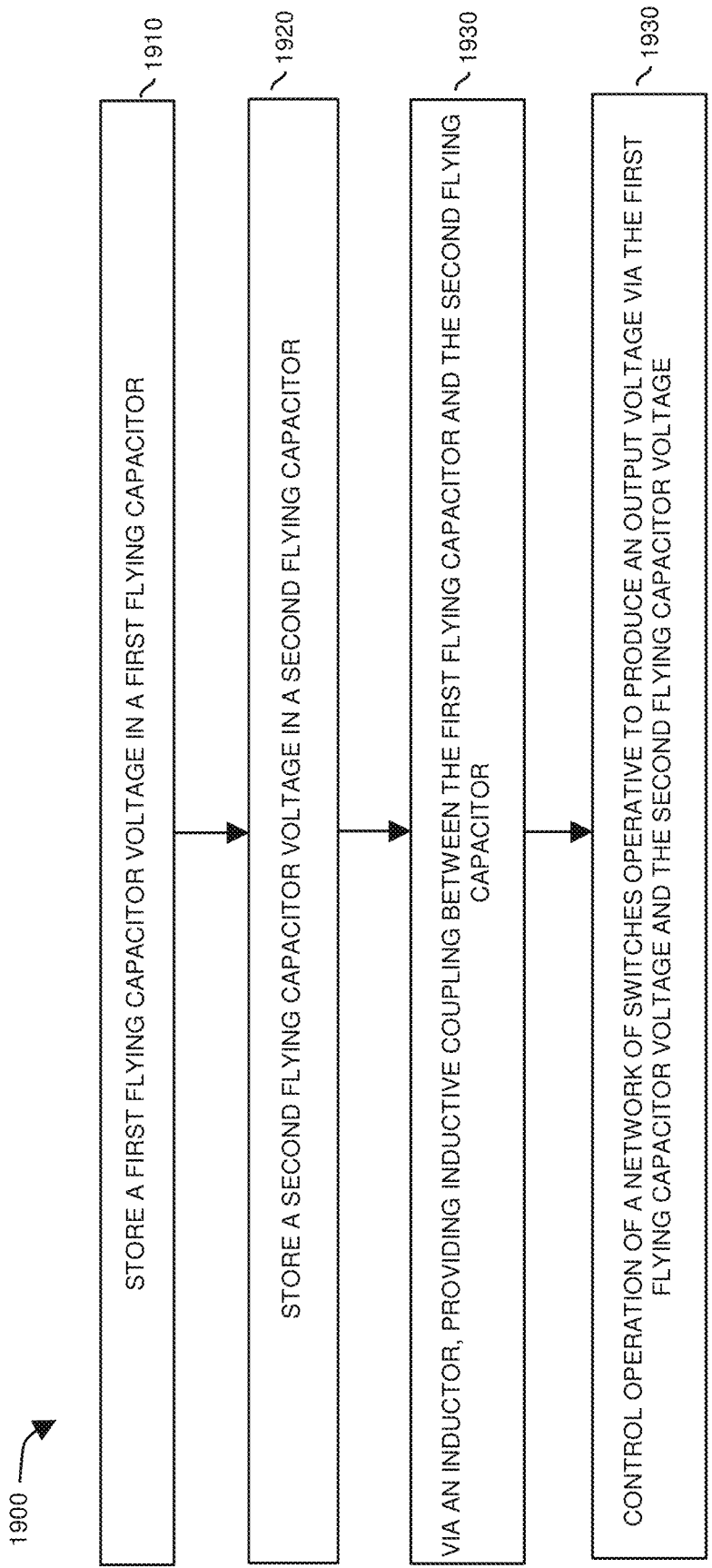
FIG. 19 is an example diagram illustrating a general method as described herein. The foregoing and other objects, features, and advantages of the disclosed matter herein will be apparent from the following more particular description herein, as illustrated in the accompanying drawings in which like reference characters refer to the same parts throughout the different views. The drawings are not necessarily to scale, with emphasis instead being placed upon illustrating the principles, concepts, aspects, techniques, etc.

FIG. 19 is a flowchart 1900 illustrating an example method as discussed herein. Note that there will be some overlap with respect to concepts as discussed above.

In processing operation 1910, a first flying capacitor stores a first flying capacitor voltage $V_{Cfly1}$.

In processing operation 1920, a second flying capacitor CF2 stores a second flying capacitor voltage $V_{Cfly2}$.

In processing operation 1930, the inductor 101 (such as Lbal) provides inductive coupling between the first flying capacitor CF1 and the second flying capacitor CF2.

In processing operation 1940, the controller 140 controls operation of a network of switches to produce an output voltage 123 via the first flying capacitor voltage $V_{Cfly1}$ and the second flying capacitor voltage $V_{Cfly2}$.

Note again that techniques herein are well suited for use in power supply applications. However, it should be noted that the disclosure of matter herein is not limited to use in such applications and that the techniques discussed herein are well suited for other applications as well.

While this invention has been particularly shown and described with references to preferred aspects thereof, it will be understood by those skilled in the art that various changes in form and details may be made therein without departing from the spirit and scope of the present application as defined by the appended claims. Such variations are intended to be covered by the scope of this present application. As such, the foregoing description in the present disclosure is not intended to be limiting. Rather, any limitations to the invention are presented in the following claims.

The invention claimed is:

1. An apparatus comprising:
   a first flying capacitor operative to store a first flying capacitor voltage;
   a second flying capacitor operative to store a second flying capacitor voltage;
   a first inductor providing coupling between the first flying capacitor and the second flying capacitor;
   a network of switches operative to produce an output voltage via the first flying capacitor voltage and the second flying capacitor voltage;
   a controller operative to control the network of switches to substantially equalize an average magnitude of the first flying capacitor voltage and an average magnitude of the second flying capacitor voltage;
   wherein the network of switches includes a first switch and a second switch, a first node connecting the first switch and the second switch in series;
   wherein the first inductor is directly coupled to the first node; and
   wherein the controller is further operative to simultaneously activate the first switch and the second switch to convert an input voltage into the output voltage.

2. The apparatus as in claim 1, wherein the first inductor is operative to convey energy between the first flying capacitor and the second flying capacitor.

3. The apparatus as in claim 1, wherein the network of switches is operative to, based on input from the controller, control conveyance of energy received from an input voltage to the first flying capacitor and the second flying capacitor;
   wherein the average magnitude of the first flying capacitor voltage is substantially equal to a magnitude of the input voltage divided by 2; and
   wherein the average magnitude of the second flying capacitor voltage is substantially equal to a magnitude of the input voltage divided by 2.

4. The apparatus as in claim 1, wherein a first terminal of the first inductor is directly connected to a terminal of the first flying capacitor; and
   wherein a second terminal of the first inductor is directly connected to a terminal of the second flying capacitor.

5. The apparatus as in claim 1, wherein the controller is operative to control operation of the network of switches in a mode in which: the first flying capacitor is charged, the second flying capacitor is discharged, and a magnitude of current through the first inductor varies over time.

6. The apparatus as in claim 1, wherein the controller is further operative to control operation of the network of switches in a mode in which: the first flying capacitor is neither charged nor discharged and the second flying capacitor is neither charged nor discharged, and a magnitude of current through the first inductor is constant.

7. The apparatus as in claim 1,
   wherein the network of switches includes a first sequence of switches connected in series and a second sequence of switches connected in series;
   wherein the first sequence of switches includes the first switch, the second switch, a third switch, and a fourth switch;
   wherein the second sequence of switches includes a fifth switch, a sixth switch, a seventh switch, and an eighth switch;
   the apparatus further comprising:
      a second node connecting the fifth switch and the sixth switch, the first inductor connected between the first node and the second node;
      a third node connecting the second switch and the third switch;
      a fourth node connecting the sixth switch and the seventh switch, the third node connected to the fourth node via an electrically conductive path; and
      a second inductor connected to the electrically conductive path, the second inductor operative to output the output voltage.

8. The apparatus as in claim 1,
   wherein the network of switches includes a first sequence of switches connected in series and a second sequence of switches connected in series;
   wherein the first sequence of switches includes the first switch, the second switch, a third switch, and a fourth switch;
   wherein the second sequence of switches includes a fifth switch, a sixth switch, a seventh switch, and an eighth switch;
   the apparatus further comprising:
      a second node connecting the fifth switch and the sixth switch, the first inductor connected between the first node and the second node;
      a third node connecting the second switch and the third switch;
      a fourth node connecting the sixth switch and the seventh switch, the third node connected to the fourth node via an electrically conductive path; and
      a second inductor connected to the electrically conductive path, the second inductor operative to produce the output voltage.

9. The apparatus as in claim 1, wherein a first terminal of the first switch is coupled to a reference voltage, wherein a first terminal of the second switch is coupled to the reference voltage; and
   wherein the first inductor is directly coupled between a second terminal of the first switch and a second terminal of the second switch.

10. The apparatus as in claim 9, wherein the reference voltage is an input voltage supplied by an input voltage source, the input voltage converted into the output voltage.

11. The apparatus as in claim 9, wherein the reference voltage is a ground reference.

12. The apparatus as in claim 1, wherein the control of the network of switches is operative to control a flow of current through the first inductor.

13. The apparatus as in claim 1, wherein the network of switches is configured to receive an input voltage converted into the output voltage;
   wherein control of the network of switches is operative to maintain the average magnitude of the first flying capacitor voltage to be substantially equal to half a magnitude of the input voltage; and
   wherein control of the network of switches is operative to maintain the average magnitude of the second flying capacitor voltage to be substantially equal to half the magnitude of the input voltage.

14. An apparatus comprising:
   a first flying capacitor operative to store a first flying capacitor voltage;
   a second flying capacitor operative to store a second flying capacitor voltage;
   a first inductor providing coupling between the first flying capacitor and the second flying capacitor;

a network of switches operative to produce an output voltage via the first flying capacitor voltage and the second flying capacitor voltage; and a controller operative to control the network of switches to substantially equalize an average magnitude of the first flying capacitor voltage and an average magnitude of the second flying capacitor voltage;

wherein the network of switches includes a first circuit path and a second circuit path connected in series through a first circuit node;

wherein the first circuit path includes a first switch and a second switch, a second circuit node operative to connect the first switch and the second switch in series;

wherein the second circuit path includes a third switch and a fourth switch, a third circuit node operative to connect the third switch and the fourth switch in series; and wherein the controller is operative to, in a first portion of a control cycle, simultaneously activate the first switch, the second switch, the third switch, and the fourth switch to ON states.

15. The apparatus as in claim 14, wherein the controller is further operative to:

in a second portion of the control cycle: i) activate the first switch and the fourth switch to ON states; and ii) deactivate the second switch and the third switch to OFF states.

16. The apparatus as in claim 15, wherein the controller is operative to:

in a third portion of the control cycle: i) deactivate the first switch and the fourth switch to OFF states; and ii) activate the second switch and the third switch to ON states.

17. The apparatus as in claim 16 further comprising:

a second inductor operative to convey current received from the first circuit node to produce the output voltage;

wherein a first node of the first inductor is directly connected to the second circuit node coupling the first switch and the second switch in series; and wherein a second node of the first inductor is directly connected to the third circuit node coupling the third switch and the fourth switch in series.

18. An apparatus comprising:

a first flying capacitor operative to store a first flying capacitor voltage;

a second flying capacitor operative to store a second flying capacitor voltage;

a first inductor providing coupling between the first flying capacitor and the second flying capacitor;

a network of switches operative to produce an output voltage via the first flying capacitor voltage and the second flying capacitor voltage;

a controller operative to control the network of switches to substantially equalize an average magnitude of the first flying capacitor voltage and an average magnitude of the second flying capacitor voltage;

wherein the network of switches includes: i) a first sequence of switches including a first switch, a second switch, a third switch, and a fourth switch, connected in series, and ii) a second sequence of switches including a fifth switch, a sixth switch, a seventh switch, and an eighth switch, connected in series;

wherein a first node of the first inductor is directly connected to a first circuit node coupling the third switch and the fourth switch in series; and wherein a second node of the first inductor is directly connected to a second circuit node coupling the seventh switch and the eighth switch in series.

19. The apparatus as in claim 18, wherein the controller is operative to simultaneously control the third switch, the fourth switch, the seventh switch, and the eighth switch, to an ON state during a portion of the control cycle to convert an input voltage into the output voltage.

20. The apparatus as in claim 19, wherein the first switch and the fifth switch are operative to receive the input voltage from an input voltage source.

\* \* \* \* \*

UNITED STATES PATENT AND TRADEMARK OFFICE
CERTIFICATE OF CORRECTION

PATENT NO. : 12,362,648 B2
APPLICATION NO. : 17/734339
DATED : July 15, 2025
INVENTOR(S) : Roberto Rizzolatti et al.

Page 1 of 1

It is certified that error appears in the above-identified patent and that said Letters Patent is hereby corrected as shown below:

In the Claims

Claim 14, Line 5, replace "voltage:" with --voltage;--

Claim 14, Line 7, replace "capacitor:" with --capacitor;--

Signed and Sealed this
Twenty-third Day of September, 2025

John A. Squires
*Director of the United States Patent and Trademark Office*